US012703379B2

(12) United States Patent
Samani et al.

(10) Patent No.: US 12,703,379 B2
(45) Date of Patent: Aug. 11, 2026

(54) METHOD AND SYSTEM FOR COLLABORATIVE TASK-BASED ALLOCATION BETWEEN HUMAN AND AUTONOMOUS SYSTEMS

(71) Applicant: United States of America as represented by the Administrator of NASA, Washington, DC (US)

(72) Inventors: Saeideh E. Samani, Williamsburg, VA (US); Richard K. Jessop, Williamsburg, VA (US); Tyler D. Fettrow, Hayes, VA (US); Angela R. Harrivel, Poquoson, VA (US); Chad L. Stephens, Poquoson, VA (US); Alan T. Pope, Poquoson, VA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 63 days.

(21) Appl. No.: 18/797,923

(22) Filed: Aug. 8, 2024

(65) Prior Publication Data

US 2024/0400083 A1 Dec. 5, 2024

Related U.S. Application Data

(63) Continuation of application No. 17/685,027, filed on Mar. 2, 2022, now Pat. No. 12,172,660.

(Continued)

(51) Int. Cl.
*B60W 50/14* (2020.01)
*B60W 40/08* (2012.01)

(Continued)

(52) U.S. Cl.
CPC ............ *B60W 50/14* (2013.01); *B60W 40/08* (2013.01); *B60W 60/001* (2020.02); *B60W 2040/0818* (2013.01); *B60W 2050/0001* (2013.01)

(58) Field of Classification Search
CPC .... B60W 50/14; B60W 60/001; B60W 40/08; B60W 2040/0818; B60W 2050/0001

(Continued)

(56) References Cited

U.S. PATENT DOCUMENTS 4,337,049 A 6/1982 Connelly
4,508,510 A 4/1985 Clifford (Continued)

FOREIGN PATENT DOCUMENTS

CN 113288174 B 8/2022

OTHER PUBLICATIONS

Stephens, C., et al., "Crew State Monitoring and Line-Oriented Flight Training for Attention Management," 19th International Symposium on Aviation Psychology (ISAP 2017), pp. 1-6.

(Continued)

*Primary Examiner* — Mahmoud S Ismail

(74) *Attorney, Agent, or Firm* — Robin W. Edwards; M. Bruce Harper; Trenton Roche

(57) ABSTRACT

A method for determining a human operator's visual attention to an operating panel of a vehicle during vehicle operation is described. The method includes: receiving and processing data indicative of the human operator's gaze direction from at least one monitoring device over a period of time; determining, by the processor, an approximate location of the human operator's gaze on the operating panel at different individual times over the period of time; identifying, by the processor, any individual areas-of-interest (AOI) located at each of the determined approximate loca- (Continued)

tions of the human operator's gaze; and calculating, by the processor, a value for at least one metric using at least the determined approximate locations at different individual times and the identification of any individual AOI at the determined approximate locations to determine the human operator's attention to the operating panel.

20 Claims, 16 Drawing Sheets

Related U.S. Application Data

(60) Provisional application No. 63/592,989, filed on Oct. 25, 2023, provisional application No. 63/156,259, filed on Mar. 3, 2021.

(51) Int. Cl.
*B60W 60/00* (2020.01)
*B60W 50/00* (2006.01)

(58) Field of Classification Search
USPC .......................................................... 701/36
See application file for complete search history.

(56) References Cited

U.S. PATENT DOCUMENTS 5,377,100 A 12/1994 Pope
5,626,140 A 5/1997 Feldman
5,697,791 A 12/1997 Nashner
5,702,323 A 12/1997 Poulton
5,743,744 A 4/1998 Cassily
5,907,819 A 5/1999 Johnson
5,947,868 A 9/1999 Dugan
5,984,684 A 11/1999 Brostedt
6,067,468 A 5/2000 Korenman
6,093,146 A 7/2000 Filangeri
6,104,948 A 8/2000 Bogart
6,126,449 A 10/2000 Burns
6,132,337 A 10/2000 Krupka
6,148,280 A 11/2000 Kramer
6,167,298 A 12/2000 Levin
6,212,427 B1 4/2001 Hoover
6,240,309 B1 5/2001 Yamashita
6,259,889 B1 7/2001 Ladue
6,261,189 B1 7/2001 Saville
6,277,030 B1 8/2001 Baynton
6,425,764 B1 7/2002 Lamson
6,450,820 B1 9/2002 Palsson
6,463,365 B1 10/2002 Anagnost
6,463,385 B1 10/2002 Fry
6,478,735 B1 11/2002 Pope
6,491,647 B1 12/2002 Bridger
6,527,700 B1 3/2003 Manico
6,682,351 B1 1/2004 Abraham-Fuchs
6,774,885 B1 8/2004 Even-Zohar
6,778,866 B1 8/2004 Bettwy
6,786,730 B2 9/2004 Bleckley
7,570,991 B2 8/2009 Milgramm
7,621,871 B2 11/2009 Downs, III
7,933,645 B2 4/2011 Strychacz
8,062,129 B2 11/2011 Pope
8,164,485 B2 4/2012 Prinzel, III
8,356,004 B2 1/2013 Jung
8,628,333 B2 1/2014 Prinzel, III
8,827,717 B2 9/2014 Pope
8,858,323 B2 10/2014 Nguyen
8,858,325 B2 10/2014 Pope
9,084,933 B1 7/2015 Pope
9,104,948 B2 8/2015 Scheuer
9,498,704 B1 11/2016 Cohen
9,848,812 B1 12/2017 Harrivel
10,332,245 B1 6/2019 Price
10,569,650 B1 * 2/2020 Riley, Sr. .............. B60W 50/16
10,796,246 B2 10/2020 Gupta
10,958,512 B2 3/2021 Soon-Shiong
11,017,339 B2 5/2021 Rocco
11,151,883 B2 10/2021 Kline
11,413,534 B2 8/2022 Inaba
11,625,636 B2 4/2023 Stone
11,669,590 B2 6/2023 Hyland
11,857,882 B1 1/2024 Almog
2003/0013071 A1 1/2003 Thomas
2003/0013072 A1 1/2003 Thomas
2003/0087220 A1 5/2003 Bessette
2003/0139654 A1 7/2003 Kim
2005/0014113 A1 1/2005 Fleck
2008/0081692 A1 4/2008 Pope
2009/0082692 A1 3/2009 Hale
2010/0185113 A1 7/2010 Peot
2010/0292545 A1 11/2010 Berka
2011/0009777 A1 1/2011 Reichow
2011/0161011 A1 6/2011 Hasson
2012/0212353 A1 8/2012 Fung
2012/0289869 A1 11/2012 Tyler
2012/0316793 A1 12/2012 Jung
2018/0096614 A1 4/2018 Pradeep
2019/0135176 A1 * 5/2019 Miki .................... G07C 5/0816
2020/0122745 A1 * 4/2020 Tivesten .............. B60K 28/066
2020/0198465 A1 6/2020 Tanabe
2020/0302825 A1 9/2020 Sachs
2021/0107530 A1 4/2021 Buerkle
2021/0402993 A1 * 12/2021 Zhao ...................... B60K 35/28
2022/0121867 A1 * 4/2022 Arar ...................... G06V 10/454
2022/0126837 A1 * 4/2022 Croxford ................ G06F 3/013
2023/0094154 A1 3/2023 Fields
2024/0001231 A1 1/2024 Almog
2024/0043015 A1 * 2/2024 Fields ................... B60W 50/14
2024/0202833 A1 * 6/2024 Binion .................. B60W 40/08

OTHER PUBLICATIONS

Harrivel, et al., "Crew State Monitoring (CSM) and Trust in Humans (TIH)," NASA Langley Research Center Presentation Slides, Crew System and Aviation Operations Peer Review, Jan. 27, 2016, pp. 1-63, Hampton, VA.
Zacharias, Greg, "Autonomous Horizons: The Way Forward, vol. 2, Human Autonomy Teaming," United States Department of Defense, United States Air Force, Maxwell Air Force Base, Zacharias, Al: Air University Press, Jan. 2019 (Public Release Case No. 2015-0267), pp. xxi-xxix, 16-23, 97-116 and 241-244.
Dr. Ray Comstock, et al., Commercial Aviation Safety Team, "Airplane State Awareness (ASA) Joint Safety Analysis Team (JSAT) Report," Jun. 17, 2014, pp. 1-16.
Harrivel, A., et al., "A Comparative EEG Sensor Analysis for Attentional State Prediction," AsMA 2018, Sensors and Symptoms: Research in Physiological Events, May 7, 2018, pp. 1-26.
Harrivel, A., et al., fNIRS Feature Importance for Attentional State Prediction. Extended abstract accepted to the 2nd International Neuroergonomics Conference. Jun. 27-29, 2018, Philadelphia, PA, pp. 1-4.
Harrivel, A. R., et al., "Monitoring attentional state with fNIRS," Frontiers in Human Neuroscience, Dec. 2013, pp. 1-11.
Harrivel, A, R., et al., "Dynamic filtering improves attentional state prediction with fNIRS," Biomed, Optics Express, 2016, vol. 7 No. 3, pp. 1-24.
Harrivel, A. R., et al., "Psychophysiological Sensing and State Classification for Attention Management in Commercial Aviation," AIAA SciTech Forum, Jan. 4-8, (AIAA 2016-1490), San Diego, California, pp. 1-8.
Pope, A. T., et al., "Biocybernetic System Validates Index of Operator Engagement, in Automated Task," Biological Psychology, May 1995, pp. 187-195, vol. 40, Issues 1-2.
Stephens, C. L., et al., "Adaptive Automation for Mitigation of Hazardous States of Awareness," The Handbook of Operator Fatigue, 2012, Chapter 26, pp. 416-439 . . . .

* cited by examiner

METHOD AND SYSTEM FOR COLLABORATIVE TASK-BASED ALLOCATION BETWEEN HUMAN AND AUTONOMOUS SYSTEMS

CROSS-REFERENCE TO RELATED PATENT APPLICATION(S)

This application is a continuation-in-part of U.S. application Ser. No. 17/685,027 filed on Mar. 2, 2022, which claims the benefit of U.S. Provisional Patent Application No. 63/156,259, filed on Mar. 3, 2021. This application also claims the benefit of U.S. Provisional Application No. 63/592,989 filed on Oct. 25, 2023. The contents of each of these applications is hereby incorporated by reference in their entirety.

This patent application cross-references: U.S. Pat. Nos. 11,783,228 and 10,997,526 and related U.S. patent application Ser. No. 18/374,923 entitled System and Method for Human Operator and Machine Integration, and U.S. Pat. No. 10,192,173 entitled System and Method for Training of State-Classifiers, which are incorporated herein by reference in their entireties.

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

Urban Air Mobility (UAM) envisions a safe and efficient aviation transportation system that will use highly (and eventually fully) automated aircraft which will operate and transport passengers or cargo at low altitudes within urban and suburban areas. By way of example, the National Aeronautics and Space Administration (NASA) is developing a framework to integrate UAM, including an automated electrical Vertical Take-Off and Landing aircraft (e-VTOL) with a capacity of four to six passengers. UAM will be composed of an ecosystem that considers the evolution and safety of the aircraft, the framework for operation, access to airspace, infrastructure development, and community engagement. The idea of shared mobility services has emerged to not only alleviate demand for parking spaces, but also to reduce the vehicle ownership and environmental impacts. This interest has been reflected in aviation.

Similarly, Advanced Air Mobility (AAM) builds upon the UAM concept by incorporating use cases not specific to operations in urban environments, e.g., moving people and cargo between places previously not served or underserved by aviation at local, regional, intraregional, urban levels. A significant economic barrier or drag on the introduction of these concepts is the cost of an onboard human vehicle operator. Most current commercial transport flights require two licensed pilots.

In parallel with the push for a viable UAM system, space exploration and travel also remain one of the next great frontiers. The vehicles required to support missions to the moon, Mars and beyond will depend on advanced technologies, including autonomous systems.

For UAM vehicle operations to be economically viable, there must be a migration path that simultaneously increases public trust and confidence with UAM operations and reduces the number of operators to one. And, eventually, it is envisioned that the remaining human operator will be replaced with a fully autonomous flight control system.

UAM hazard and risk management as well as contingency management must be considered. In the UAM world, there should be a contingency response manager who is responsible to manage the situation and assist the pilot, similar to dispatchers, as they support pilots in the current airspace. Furthermore, there is a need for a framework to manage response to emergencies in UAM operations where the pilot is no longer able to manage the situation with ground-based support.

A significant step towards single pilot and eventually fully autonomous flight control is to manage the current intersection between human operators, e.g., human pilots, and automation technology. Which should have ultimate authority over the system, e.g., aircraft, and does the answer change depending on the circumstance? Specifically, how does a shared system account for human performance degradation, such as, for example, fatigue, startle response, distraction, and/or incapacitation. Most of the research in human-autonomy teaming is about the need for humans to take over control or the implementation of a plan and make decisions in critical situations or to return the control initiatives to humans when the automated subtask is complete. In recent years, interoperability between human and automation has been referenced in the literature as Human-Autonomy Teaming (HAT). Most existing studies agree that humans should be the final authority in HAT systems and always have the supervisory responsibility. However, systems and methods which subjectively favor humans in decision making scenarios could increase human error due to situational awareness issues, or a lack of trust in automation. Although discussed herein with reference to flight and flight simulation embodiments, HAT systems and processes are applicable to any and all human-autonomy teaming scenarios, e.g., humans working toward a shared goal with robots, autonomous vehicles or crafts or other autonomous systems.

Prior art systems for managing human-autonomy interoperability include the Multi-modal Immersive Intelligent Interface for Remote Operation (MIIIRO) and the Autonomous Constrained Flight Planner (ACFP). Multi-modal Immersive Intelligent Interface for Remote Operation (MIIIRO) has the ability for either manual or automatic modes. The design also includes visualization modes to help situational awareness. The operator can update the plan in emergency scenarios and when necessary. One such mode is a tactical situation display, which is a method of alerting the operator on contingencies. Autonomous Constrained Flight Planner (ACFP) is a recommender system that supports rapid diversion decisions for commercial pilots in non-normal situations. These prior art systems do not invoke intelligent automated systems, nor do they allow for dynamic, moment-by-moment or continuous, function-by-function task assignment and re-assignment.

Adding another level of input to the methods and systems for managing human-autonomy interoperability are systems which monitor human psychophysiological activity and use results to assign or re-assign tasks to automation.

Psychophysiological sensors have been used in different studies to predict emotional and cognitive states of the body such as workload, attention, and awareness. There are different types of wireless psychophysiological sensors available for such studies. Attention-related human performance limiting states (AHPLS) is one of the methods of safety enhancement called "Training for Attention Management." The prediction of AHPLS has been studied by applying psychophysiological sensors and collecting data from a human subject study conducted in a flight simulator. Communicating information regarding the status of the operator to the autonomous system can help guide the selection of contingency plans for a more graceful transfer of control when the human needs to recover, thus reducing some of the costs associated with HAT.

Crew State Monitoring System (CSM) software has been designed and developed that uses a broad range of sensors to measure psychophysiological activity of the body in high-fidelity flight simulation studies in real-time. By way of example, U.S. Pat. No. 10,997,526 describes one or more embodiments which evaluate and determine a cognitive state of an operator and allocate tasks to either a machine and/or human operator based on, inter alia, the operator's cognitive state. The embodiments utilize trained multistate classifiers to classify an operator's cognitive state using the sensor data. U.S. Pat. No. 10,192,173 describes exemplary classifiers. And Stephens, C. et al., Crew State Monitoring and Line-Oriented Flight Training for Attention Management, 19th International Symposium on Aviation Psychology (ISAP 2017), together with Harrivel, A., et al., Prediction of Cognitive States during Flight Simulation using Multimodal Psychophysiological Sensing, American Institute of Aeronautics and Astronautics SciTech Forum (AIAA SciTech 2017), describe an embodiment of a CSM system and are incorporated herein by reference. This software supports aviation training methods to reduce accidents and incidents, many of which involve flight crew distractions due to diverted and channelized attention.

To this point, the prior art systems and methods have been fairly limited in scope and application. Generally confined to a laboratory setting, most studies are based on action or execution simulations with a moderate level of difficulty. Further, most of the prior art studies address partially—not highly—autonomous systems. Prior art systems currently employ an "all or none" predetermined approach to switching a task from human operator to an autonomous system. There is no HAT collaboration as all actions are predetermined.

Accordingly, while the prior art has made a number of strides in the area of human-autonomy interoperability management, there remains much work to be done to achieve seamless, real-time responsiveness for efficient, safe and dynamic allocation of tasks in difficult scenarios with highly autonomous systems. In order to achieve the envisioned UAM system and to support space-based missions, the vehicular technology, simulated and live, needs to evolve to implement collaborative task-based allocation and re-allocation between pilot/operator and autonomous systems.

BRIEF SUMMARY OF THE INVENTION

One embodiment of the invention is a method for determining a human operator's visual attention to an operating panel of a vehicle during vehicle operation, the method comprising: receiving, by a processor, data indicative of the human operator's gaze direction from at least one monitoring device over a first period of time; determining, by the processor, an approximate location of the human operator's gaze on the operating panel at different individual times over the first period of time; identifying, by the processor, any individual areas-of-interest (AOI) located at each of the determined approximate locations of the human operator's gaze; and calculating, by the processor, a first value for at least one metric using at least the determined approximate locations at different individual times and the identification of any individual AOI at the determined approximate locations to determine the human operator's attention to the operating panel.

Another embodiment of the invention is a at least one non-transitory computer-readable medium storing instructions that, when executed by a computer, perform a method for determining a human operator's visual attention to an operating panel of a vehicle during vehicle operation, the method comprising: receiving, by a processor, data indicative of the human operator's gaze direction from at least one monitoring device over a period of time; determining, by the processor, an approximate location of the human operator's gaze on the operating panel at different individual times over the period of time; identifying, by the processor, any individual areas-of-interest (AOI) located at each of the determined approximate locations of the human operator's gaze; and calculating, by the processor, a value for at least one metric using at least the determined approximate locations at different individual times and the identification of any individual AOI at the determined approximate locations to determine the human operator's attention to the operating panel.

Yet another embodiment of the invention is a method for determining a human operator's visual attention to an operating panel of a vehicle during vehicle operation, the method comprising: receiving, by a processor, data indicative of the human operator's gaze direction from at least one monitoring device over a first predetermined period of time; determining, by the processor, an approximate location of the human operator's gaze on the operating panel at different individual times over the first predetermined period of time; identifying, by the processor, any individual areas-of-interest (AOI) located at each of the determined approximate locations of the human operator's gaze; calculating, by the processor, a value for at least one metric using at least the determined approximate locations at different individual times and the identification of any individual AOI at the determined approximate locations during the first predetermined period of time to determine the human operator's visual attention to the operating panel; receiving, by the processor, data indicative of the human operator's gaze direction from at least one monitoring device over a second predetermined period of time; repeating the determining, identifying and calculating during the second period of time; and calculating a summary statistic for the value of the at least one metric using a first value for the at least one metric calculated during the first predetermined period of time and a second value for the at least one metric calculated during the second predetermined period of time.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

Various example embodiments may be more completely understood in consideration of the following detailed description in connection with the accompanying drawings, in which.

DETAILED DESCRIPTION OF THE INVENTION

Successful introductory UAM integration into the National Airspace System (NAS) will be contingent on resilient safety systems that support reduced-crew flight operations. UAM vehicles will necessarily incorporate and rely, at least to some extent, on autonomous components and processes. The ability to actively manage the assignment of vehicle operation tasks between human operators and autonomous components is critical to moving transportation both on earth and in space to the next level. As used herein, a human operator or user refers to a mammalian species, such as a human, that is operating at least one function of a device, such as a vehicle. A vehicle may include but is not limited to an automobile, boat, aircraft or space-capable apparatus amongst others. Certain vehicles may be configured to carry one or more individuals and/or cargo. In some embodiments, one or more vehicles may be configured to at least be partially controlled by one or more occupants of the vehicle. As will be appreciated by those skilled in the art, a vehicle may be at least partially remotely operated, as such a user is driving or controlling functions the vehicle from a remote location with respect to the vehicle itself. In yet other embodiments, a first user may be local with respect to the vehicle and a second user or human operator may be remote with respect to the same vehicle. In one instance, a first user may control certain aspects of the vehicle that includes at least one aspect that is outside of the control of one or more additional operator or user.

The systems described herein perform three interconnected functions: 1) monitor an operator's physiological state 2) assesses when the operator is experiencing one or more anomalous states; and 3) mitigate risks by a combination of dynamic, context-based unilateral or collaborative dynamic function allocation of operational tasks. At a high level, the monitoring process receives high data-rate sensor values from psychophysiological sensors, e.g., eye-tracking, electrocardiogram, electroencephalography etc. The assessment process takes these values and performs a classification developed using machine learning algorithms. The mitigation process invokes a collaboration protocol called DFACCto which, based on context at a given point in time, causes one or more autonomous operation modules to perform one or more tasks that the human operator would otherwise routinely execute. Alternately, for example in an uncertain, complex situation requiring human expertise. DFACCto may cause the return of a task or function to the human operator. Context can include, but is not limited to situational designations which change over time such as nominal, overloaded, emergency, test, uncertain, complex and unknown, depending on, e.g., the state of vehicle, state of the autonomous system, state of the human operator, current team performance level, current operating environment, etc.

Figure 1:
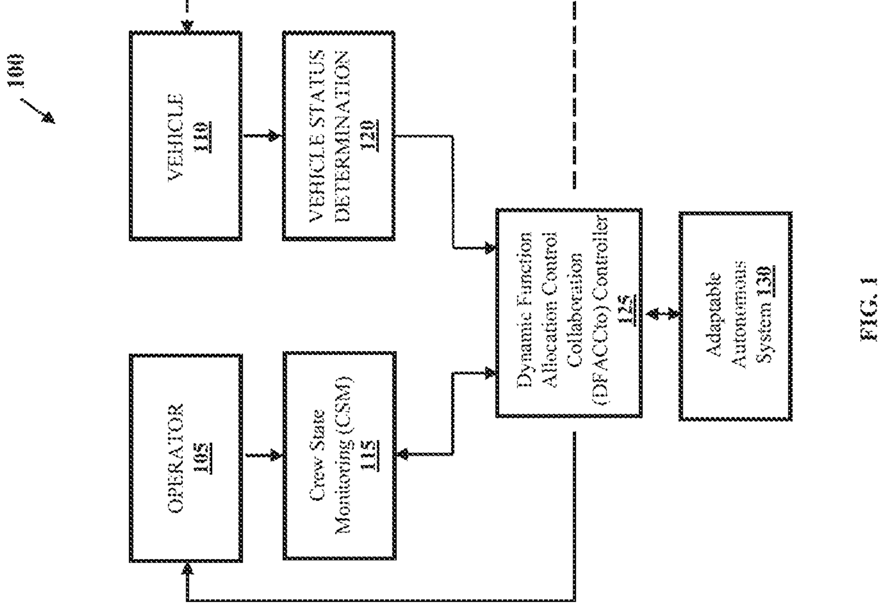
FIG. 1 is a high level block diagram of a system for operator status determination and task allocation, consistent with various embodiments of the present disclosure.

FIG. 1 provides a high level block diagram of the system 100 of the preferred embodiments. At base, the system 100 includes one or more human operators 105, a vehicle (vehicle simulator) 110, a crew state monitoring (CSM) module 115, a vehicle status determination module 120, a DFACCto module 125 and an adaptable autonomous system 130. FIG. 1 is not intended to limit the system. One skilled in the art recognizes that additional components, modules, subsystems, systems and functionality may be added to the system and/or combined with those identified in FIG. 1. Additionally, certain components and/or functionality shown separately, may be consolidated in a single processor and/or physical manifestation. For example, although illustrated separately, the adaptable autonomous system 130 may be part of the vehicle 110. In the case of simulator embodiments, the vehicle is vehicle simulator, which one skilled in the art will recognize may have different configurations and components to simulate desired situations. The interconnected functions referenced above are applicable to both simulation and real-world operations. Certain alternative and exemplary embodiments are further described herein.

The present embodiments expand on the existing art and provide for incorporation of an additional psychophysiological sensor for collection of human eye-tracking data and use thereof to determine function allocation. Additionally, one or more embodiments describe improved communication methods between components of HAT systems which guide the selection and implementation of contingency plans for efficient sharing or transfer of control when the human operator needs to recover, thus reducing some of the costs associated with HAT. Further, a novel Dynamic Function Allocation (DFA) framework balances the workload for a human operator of a vehicle by dynamically distributing operations between the operator and the vehicle's automation in real-time, or enables other optimization such as for safety or efficiency or progress toward a shared HAT goal or intent, by dynamically distributing operational and functional tasks between the operator and the vehicle's automation in real-time. DFA operations include those for aviation, navigation, and communication or for other operational needs. The DFA framework provides an intuitive command/response interface to vehicle operations that is accessible with the least possible dependency on software engineering expertise. Lastly, a Dynamic Function Allocation Control Collaboration Protocol (DFACCto) invokes (or simulates) autonomous or semi-autonomous control of a vehicle, e.g., aircraft, responsive to, e.g., crew state monitoring and vehicle status data.

These novel aspects support real-time decisions regarding some or all functional task allocation based on the pilot/operator's state and also allows some or all of the tasks to be reallocated back to the user with criteria. This is distinguished from a binary, predetermined takeover of all of the operator's operational tasks. The ability to dynamically allocate and reallocate tasks between human operator and autonomous components responsive to continuous monitoring of the pilot/operator's cognitive and/or physical state is a significant advance towards the envisioned UAM.

Initially, the present embodiments employ physiological monitoring systems which implement machine learning algorithms for cognitive state prediction based on physiological data acquired from sensors in real-time. Cognitive state prediction includes the identification of suboptimal states, e.g., high/low workload, channelized attention, diverted attention, startle/surprise and crew impairment and/or incapacitation.

Cognitive state can be a significant factor effecting efficiency and safety in operation of various systems and/or vehicles. Evaluation of cognitive state, may be useful to facilitate operator training and/or enhance operability for a number of applications. Cognitive activity is associated with various physiological responses exhibited by an operator. Cognitive state may be inferred from various sources of physiological data including, for example, sensors measuring electroencephalogram (EEG), event-related potentials (ERP), functional near infrared spectroscopy (fNIRS), electrocardiogram (EKG), heart rate, blood pressure, respiration rate, skin temperature, galvanic skin response (GSR), electromyogram (EMG), pupil dilation, eye movement, gaze point, voice stress analysis (e.g., based on vocal timbre), and/or facial feature readings.

Evaluation of cognitive state can be challenging as physiological responses of an operator in a particular cognitive state may vary from person to person. To ensure accurate classification, state-classifiers used in the embodiments herein may be individually trained for each operator to map the particular physiological responses of the operator to the set of target cognitive states. As described in, for example, U.S. Pat. No. 10,192,173, cognitive state classifiers may be trained using a system configured to present stimuli to induce various target cognitive states in an operator. While presenting the stimuli, multimodal signals indicating physiological responses of the operator are sampled. One or more of the state-classifiers are trained using, for example, supervised and/or unsupervised training techniques to map characteristics of the recorded physiological responses to the target cognitive state intended to be introduced by the presented stimuli.

Pre-existing systems did not train classifiers to use eye movement or tracking or other ocular attributes to predict cognitive state. This is because previously implemented eye movement sensors required that the subjects' heads be confined to a pre-determined volume. In a particular embodiment described herein, the system and process utilize recorded eye movements and other ocular attributes to capture cognitive processes and more accurately predict cognitive state. Using machine learning methods, the process analyzes the data in real-time to assign or re-assign tasks between human operators and autonomous systems in a collaborative IIAT fashion.

Figure 2:
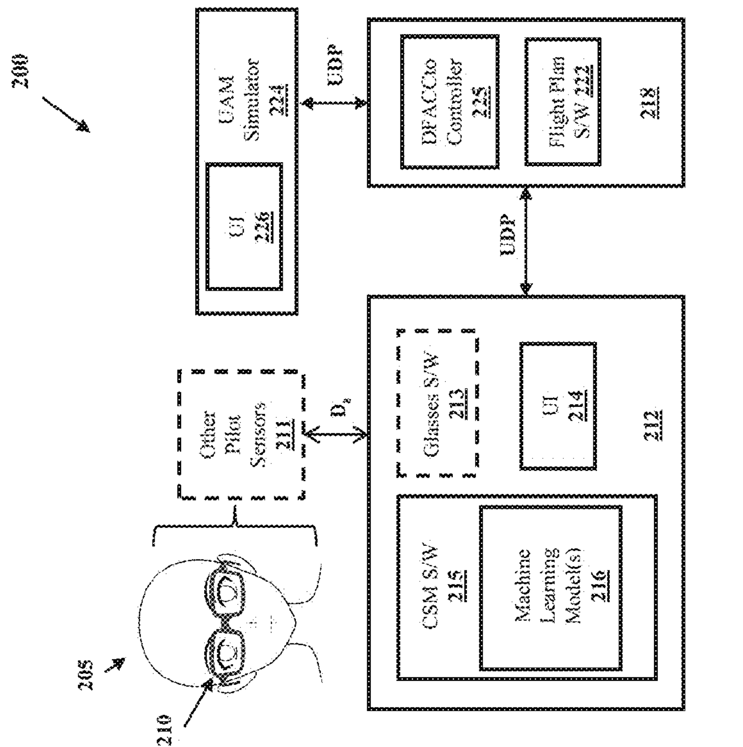
FIG. 2 is a block diagram of a system for operator status determination and task allocation, consistent with a particular embodiment of the present disclosure.

Referring to FIG. 2, an exemplary system 200 collects eye tracking data as cognitive input to a classification model which has been trained to detect cognitive decline during a flight simulation and to invoke a contingency plan which may involve reliance on a high-level autonomous system. In FIG. 2 gaze tracking eye glasses 210 are worn by the human operator 205, e.g., pilot, during a simulated exercise. By way of example, the Tobii Pro glasses 2 eye tracker device (developed by Tobii Technology AB, Danderyd, Sweden) with 50 Hz sampling rate and a maximum total system latency of 10 ms was used to record gaze data. The exemplary glasses include a recording device connected therewith. The data collected on the recording device may be retrieved using a wired or wireless connection, e.g., Bluetooth.

Data from the eye tracker 210 (and other physiological or psychophysiological pilot sensors 211) is retrieved/received by a first processor 212, e.g., a Windows machine which has CSM software 215 including machine learning models 216 instantiated thereon and a user interface UI 214. Sensor data $D_s$ may be communicated via wired or wireless protocols. By way of example, CSM software 215 collects data using a Python script from eye tracker 210 (and other psychophysiological pilot sensors 211) using the sensors' defined protocols. The CSM 215 processes the sensor data $D_s$ in accordance with machine learning models 216 to determine pilot cognitive state and packages data into a free form data string stream for transmission to a second processor via User Datagram Protocol (UDP). A second processor 218, e.g., Windows machine, includes DFACCto Controller 225 as well as additional software programs 222 that may be used to acquire flight plans for the simulation. DFACCto Controller 225 is implemented as a Qt application which is known to those skilled in the art. A third processor includes a UAM simulator machine 224 and UI 226. Machines 212, 218 and 224 in this example are on the same network, enabling the use of point-to-point UDP network communications. DFACCto Controller 225 provides connection and communication between the UAM simulator 224 and the CSM software 214 via, e.g., UDP messages, and performs user-defined actions such as notifications and/or control actions using, e.g., Common Image Generator Interface (CIGI) packets and handlers.

Processor 212 might also include software 213 specific to the tracking glasses for presenting and/or processing received/retrieved gaze data and/or for facilitating configuration of the tracking glasses 210. By way of example, for the Tobii Pro glasses 2, Tobii Pro Studio software is installed. CSM software 215 on the processor 212 is used to capture eye movement data with the tracker glasses in real-time and to record the eye movement data for further processing purposes. The recorded eye movement and other ocular attribute data including, e.g., movement data such as gaze position, gaze direction, and pupil diameter, can be analyzed in real time using, e.g., a Support Vector Machine (SVM) classifier, to predict events with an event prediction model via installed machine learning methods.

Additionally, other psychophysiological sensors 211 may also be used to collect operator data for use in making collaborative decisions. U.S. Pat. No. 10,997,526, which is incorporated herein by reference, describes systems and processes for processing psychophysiological sensor data to display the state of a human operator.

The system of FIG. 2 is part of a prototype vehicle-based HAT system integrated with a baseline UAM vehicle with custom avionics and control algorithms such as those described in Silva, C., et al., VTOL urban air mobility concept vehicles for technology development. In 2018 Aviation Technology, Integration, and Operations Conference 2018 (p. 3847), which is incorporated herein by reference. Specifically, an exemplary prototype vehicle is a six-passenger, quad-rotor vehicle, and the control algorithm is implemented using Python.

In a first testing scenario, the system of FIG. 2 is used to determine UAM pilot incapacitation and to dynamically respond thereto and allocate tasks. In the UAM simulator, the UAM pilot 205 wears the eye tracker 210, and the prototype UAM is programmed with a flight plan 222 to fly from point A to point B. Eye movement data is received at the CSM 215. Using the UAM simulator in manual mode, and while the pilot is flying the simulated vehicle following the flight path, if simulated incapacitation of the pilot is detected, a trained model 216 detects the incapacitation, the determination of pilot incapacitation is messaged to the DFACCto Controller 225 and a contingency plan is executed by the UAM simulator 224 responsive to instructions from the DFACCto Controller 225.

An incapacitated operator is assumed to be a vehicle operator who has lost consciousness or is experiencing microsleep. The UAM prototype simulator system was built such that if the pupil diameter cannot be measured for 5 seconds (non-normal $D_s$ data) by the eye tracker 210, at time $T_1$ the CSM 215 determines incapacitation and outputs an indication of such to the DFACCto Controller 225. For purposes of the incapacitation simulation, incapacitation was demonstrated simply by the operator closing their eyes. It is envisioned that other methods, including pilot stick input behavior may be monitored and are reflective of incapacitation and can be used toward the allocation of functions.

In such an extreme crew state case of incapacitation, the CSM 215: declares an emergency, e.g., by using the DFACCto Controller 225 to synthesize speech and to automatically broadcast the message to Air Traffic Control or others via the relevant radio or other output channels; changes the flight path to the vertiport with the closest medical facility (by interfacing with and communicating directly with the flight navigation control run by the flight simulator 224 via DFACCto Controller 225) while the human would interface with this flight navigation control via a graphical user interface); sends a command to the flight simulator to switch control from manual to semi-automatic mode via DFACCto Controller 225. This is an example of a total takeover due to total incapacitation, versus a partial or sliding takeover of only certain/specific controls or functional tasks for optimization purposes.

The CSM 215 then receives back, via DFACCto Controller 225, an acknowledgement or rejection, depending on the current flight simulator mode and potentially upon operator dismissal of the takeover, e.g., the pilot is no longer incapacitated (time $T_2$). This functionality of the CSM/DFACCto/Controller system enables the potential operator/pilot dismissal of the takeover. The CSM/DFACCto/Controller system changes the graphical user interface 226 to display this status in the cockpit, and also provides an option to the operator by way of a button press for dismissal of the takeover, should the pilot/operator recover and choose to do so.

The flight simulation then proceeds to execute a safe and controlled landing (enabled by the prior emergency declaration communications) at the medical facility. DFACCto Controller 225 has the information for the closest medical facility in a database and will share that information, as well as the vehicle position and speed data which the DFACCto Controller 225 receives via UDP from vehicle (or simulator) 224, with CSM 215. CSM 215 then does some calculations using the received data and sends commands to DFACCto Controller 225. DFACCto Controller 225 then sends those commands to the UAM simulator (vehicle) 224 with instructions to land at the identified medical facility. The CSM/DFACCto/Controller system unlocks the flight controls, enabling flight by qualified or certified personnel once the medical needs of the pilot/operator are met.

Semi-automatic mode is used to signify that the vehicle is not going to follow the original flight path but instead will divert to a medical facility for the purposes of the safety of the pilot onboard who is now incapacitated. The controls are locked in this scenario due to the sensed and detected incapacitation (vs. inferred from a lack of control input or other non-direct indication). For a bad actor use case, the controls may be locked out regardless of incapacitation.

Fully-automatic for the flight simulator would not be ideal here as the flight simulation navigation system would go back to following the originally-programmed flight path. Semi-automatic mode allows for partial control to be "taken" from (functional tasks no longer assigned to) one team member (the human or the system) and "given" to the other for dynamic function allocation purposes. This dynamic and partial allocation enables the optimization moment-by-moment of individual functional tasks assigned across the team members. This optimization may be based on workload, safety, efficiency, or other factors of value in the AAM or UAM airspace environment.

Figure 3A:
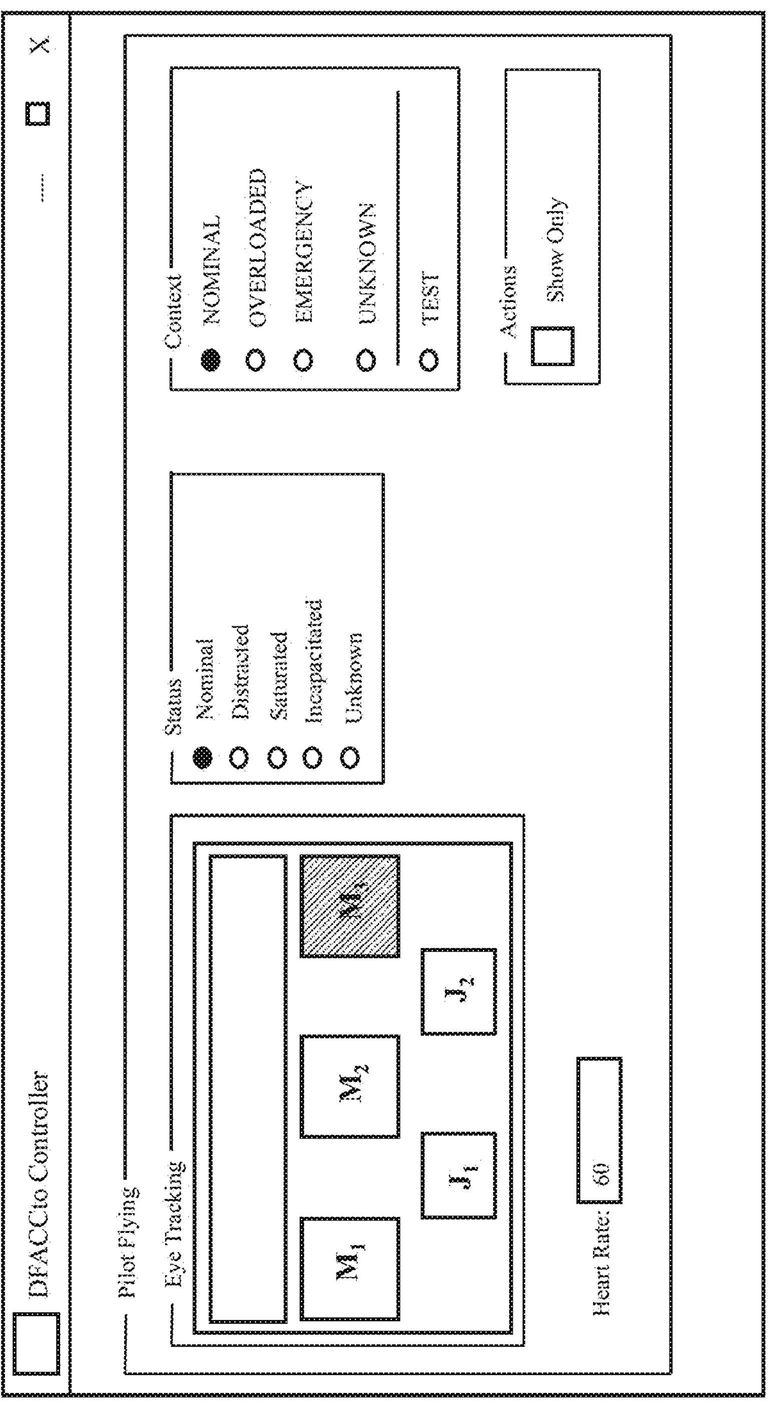
FIG. 3A is an exemplary screen shot indicating a first status of a vehicle operator determined in accordance with the system of FIG. 2.
Figure 3B:
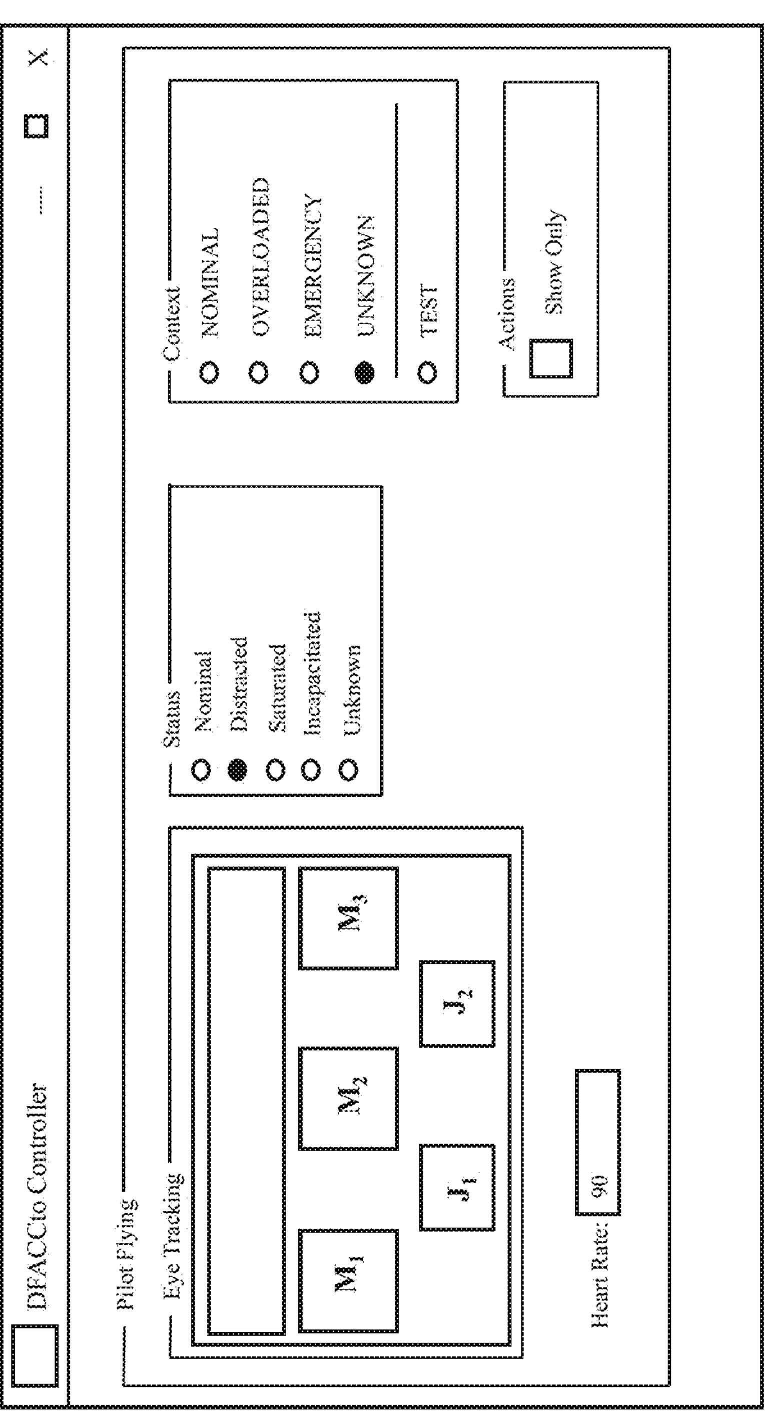
FIG. 3B is an exemplary screen shot indicating a second status of a vehicle operator determined in accordance with the system of FIG. 2.

In a second testing scenario, the system of FIG. 2 is used to determine when/if an operator is distracted. A distracted operator is assumed to be a vehicle operator 205 who appears to be visually distracted from vehicle operator tasks as detected by the eye tracker 210. This scenario can occur, for example, if the operator is handling an off-nominal vehicle event, inclement weather, or a passenger medical situation. A distracted operator may be detected by using information such as gaze position and gaze direction data recorded by the eye tracker 210. In the second testing scenario, there were five devices of interest in the UAM simulated vehicle 224 including three monitors ($M_1$, $M_2$, $M_3$) and two joysticks ($J_1$, $J_2$). An instantiated machine learning model 216 is trained such that if the operator is looking somewhere other than those five devices, the event would be predicted as distracted. For this scenario, the prototype system 200 was programmed such that if the gaze data from eye tracker 210 is different from the system's trained model data, the SVM 216 would classify that event as distracted. FIGS. 3A and 3B provide exemplary UI screenshots from the DFACCto Controller showing pilot flying status determined from eye tracking sensor data from the CSM 215. In FIG. 3A, the eye tracking data shows that the pilot is looking at one of the five expected devices, i.e., $M_3$ and status and context are shown as nominal. Whereas in FIG. 3B, status is indicated as distracted since the eye tracking data shows that the pilot is not looking at any of the five devices of interest. The mitigation process for classification of an operator as distracted invokes DFACCto Controller 225 to request that UAM simulator 224 simulate autonomous control of the aircraft wherein the vehicle mode changes to automatic mode from manual mode and automation executes the existing operation plan, e.g., 222. Note that in this example, the automation continues with the existing flight plan. This is different from the semi-automatic mode described in the first scenario, wherein the automation required a change to the original flight plan.

In this case, the system 200 will perform the mode change command and, if appropriate, hold the command until superseded by the operator 205. Since the system is dynamic and continuously collecting the operator's eye gaze data and other psychophysiological data, the system may be programmed such that once distraction is no longer sensed, vehicle mode is returned to manual and the operator is back in command. This distraction scenario was demonstrated simply by using an eye tracker and the operator not looking at the devices of interest for at least 5 seconds. Additionally heart rate variability, finger plethysmogram amplitude, and perspiration behavior may be sensed to assess operator workload or other cognitive or physical status. Other methods, including multi-modal classifications using galvanic skin response and pre-processed electroencephalography and brain electrical activity, and surveys on autonomous nervous system responses may also be incorporated to detect an overloaded operator which may be mitigated with the allocation of functional tasks.

In the case of incapacitation, additional information is needed to autonomously land the aircraft safely and to optimize a positive outcome. This information could include the hospital's location or emergency communication policies, and possibly other data regarding the operator's status using different sensors, e.g., electrocardiogram, in addition to the eye tracker.

The user interface (UI) 214 is implemented using Qt toolkit and Qt Modeling Language (Qt/QML), a UI markup language to handle declarative aspects that uses JavaScript or other high-level languages to handle imperative aspects. Voice communication is also incorporated into the system since it can be used as a backup communications system. Analog voice communications can be used for safety-critical exchanges. As referenced above, UDP is used to transport vehicle data, emergency navigation data, weather data, and other messages by and between the primary modules.

One skilled in the art recognizes that the distribution of various software and processing steps across three machines as described with respect to FIG. 2, is not so limited. Additional or fewer machines may be used in accordance with space, processing power and/or security requirements.

In the first embodiment and related testing scenarios described above, the concept of inclusion of some level of intelligence or system decision-making using measured operator status of a UAM vehicle is explored. Although the embodiment described above primarily used oculometry and eye tracking as the psychophysiological sensor data for detecting pilot incapacitation or distraction, numerous other types of sensors are also useful in predicting human cognitive and/or physical conditions. By way of example, exemplary EEG devices which detect electrical neurological brain activity include: the 24-channel advance brain monitoring (ABM); the 4-channel Muse device by InteraXon; the g-Tec device by Guger and the Epoc by Emotiv. Exemplary functional near infrared spectroscopy (fNIRS) devices for optical hemodynamic brain activation detection include: Nirex by Biopac with 16 channels and frequency domain systems such as Imagent by ISS, Inc. Exemplary electrocardiogram (ECG) devices for sensing electrical heart beats include the 3-point Nexus Mark II system and the 2-point Muse or ABM systems; Exemplary galvanic skin response (GSR) and electrodermal activity (EDA) devices measure sympathetic nervous system arousal with a NeXus-10 MKII system from Mind Media or the Empatica watch. Blood volume pulse can be detected optically with the Empatica watch or FitBit. Respiration can be detected with devices such as the strain gauge belt with the Nexus Mark II system or the belt-worn force-measurement device by Spire. Oculemetry and eye tracking including pupil size, gaze point and head tracking can be sense by, e.g., headworn Tobii Pro Glasses. U.S. Pat. Nos. 10,192,173 and 10,997,526 provide various examples related to the training of classification algorithms using sensor data to predict pilot state and the use of classifications in allocating tasks between humans and automation. One skilled in the art will appreciate that there are numerous indicators of operator distraction or incapacitations which may be determined from one or a combination of sensor results. The examples provided herein are in no way intended to be limiting.

In a second embodiment, concepts described above are applied to the design, development, testing and evaluation of space-based vehicle simulators to enable current and future space missions, e.g., moon to Mars missions. Objectives include: evaluate, develop, and validate methods and guidelines for identifying human-automation/robot task information needs, function allocation, and team composition for future long duration, long distance space missions; develop design guidelines for effective human-automation-robotic systems in operational environments that may include distributed, non-co-located adaptive mixed-agent teams with variable transmission latencies; quantify overall human-automation-robotic system performance to inform and evaluate system designs to ensure safe and efficient space mission operations; and identify and scope the critical human-automation/robotic mission activities and tasks that are required for future long duration, long distance space missions.

Figure 4:
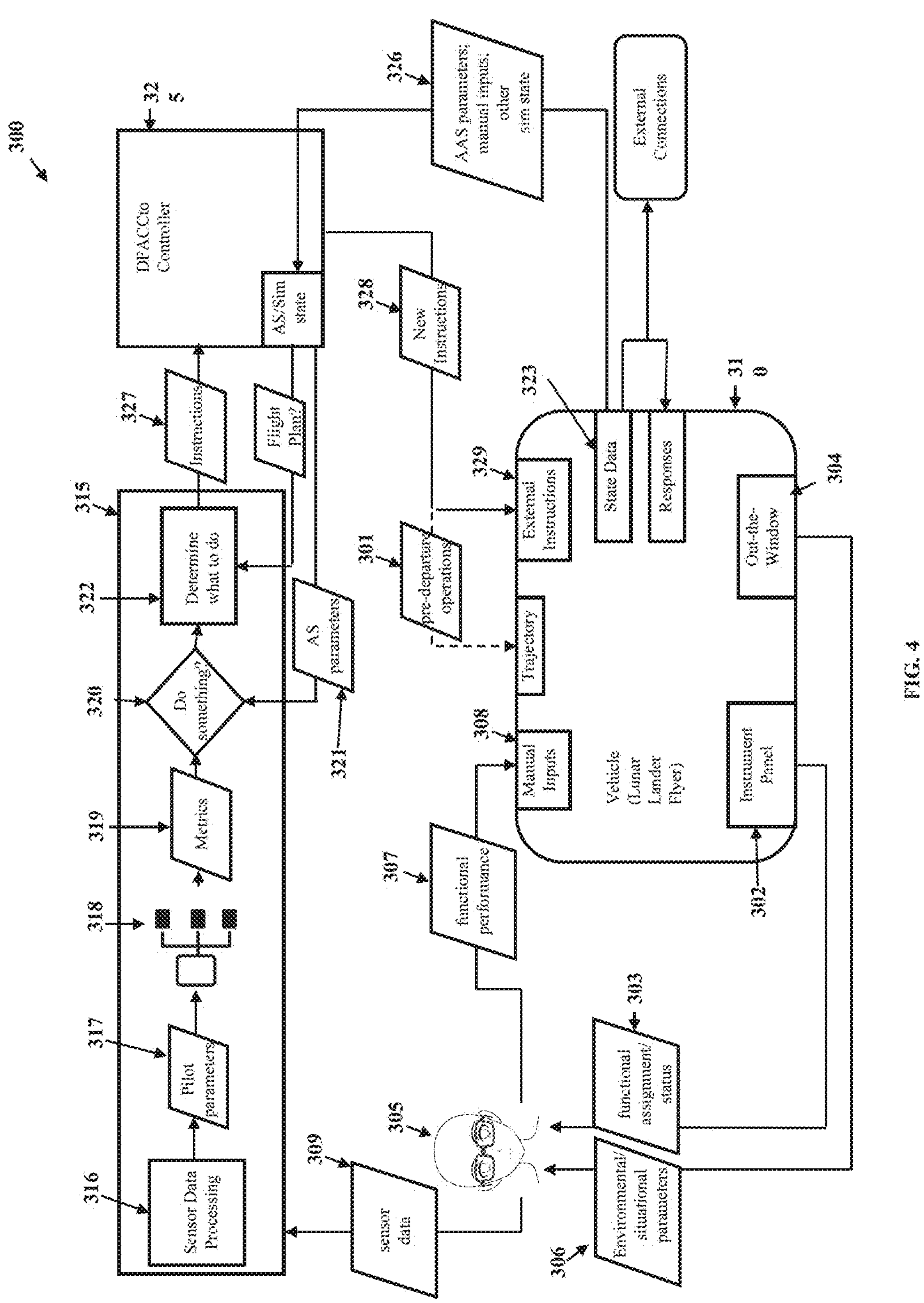
FIG. 4 is a detailed block diagram of a system for operator status determination and task allocation, consistent with a particular embodiment of the present disclosure.

FIG. 4 provides a detailed dual purpose schematic showing primary components, as well as data and instruction flow of an exemplary prototype lunar lander (simulated or actual) operating within a DFA framework 300.

From the perspective of the pilot or pilots 305, the pilot(s) receive input visually from an instrument panel 302 in the vehicle 310 (simulated or actual), e.g., functional assignments and vehicle status 303, and from out-the-window (OTW) sources 304, e.g., environmental and situational information 306 they see or is generated from OTW sources. Although not shown, auditory information may also be communicated to the pilot(s) and from the pilots(s). The pilot(s) functional performance 307 is monitored and received at manual inputs 308 as the pilot(s) 305 interact manually with the vehicle, e.g., via instrument panel switches, toggles, buttons, touchscreen, joysticks, etc. The pilot(s)' physiological and/or psychophysiological status is collected using one or more of the sensors discussed above and retrieved/received as sensor data 309 by CSM 315.

At the CSM 315, the sensor data 309 is processed using appropriate signal and imaging platforms 316 such as, for example, NeuroPype having nodes written in Python and using lab streaming layer (LSL) protocol. The processed sensor data is output as pilot(s) parameters 317 which can be input to one or more trained ML models 318 to determine existence of decision-point metrics 319, e.g., are predetermined thresholds exceeded (eyes close too long? Heartrate too high/too low? Gaze not on one of critical components for long enough?). The decision-point metrics inform whether something needs to be done; action needs to be taken 320. Also input to the determination as to whether to take action is data on what is available to take action, i.e., what autonomous system (AS) components and/or parameters 321 are available. When it is decided that something should be done, the next decision is what to do 322, e.g., control or functional task allocation change, warning or alert, diversion, etc. The CSM 315 communicates these "what to do" instructions to the DFACCto Controller 325.

The DFACCto Controller 325 also receives state data 323 (e.g., adaptive autonomous system (AAS) parameters, manual inputs and other simulator data 326) from the vehicle 301 which is passed from the DFACCto Controller 325 to the CSM 315 to inform both the decision that something needs to be done 320 and to inform the decision regarding what action(s) to take 322. DFACCto Controller 325 receives instructions 327 from the CSM 315 and communicates new instructions 328 to the vehicle 301. As discussed above, these new instructions 328, received as external instructions 329, can dynamically allocate (or reallocate) tasks between the pilot(s) 305 and autonomous capabilities of the vehicle (or simulator) 310 that may differ from the pre-departure operations allocations 301 in response to real-time changes to pilot status.

Figure 5:
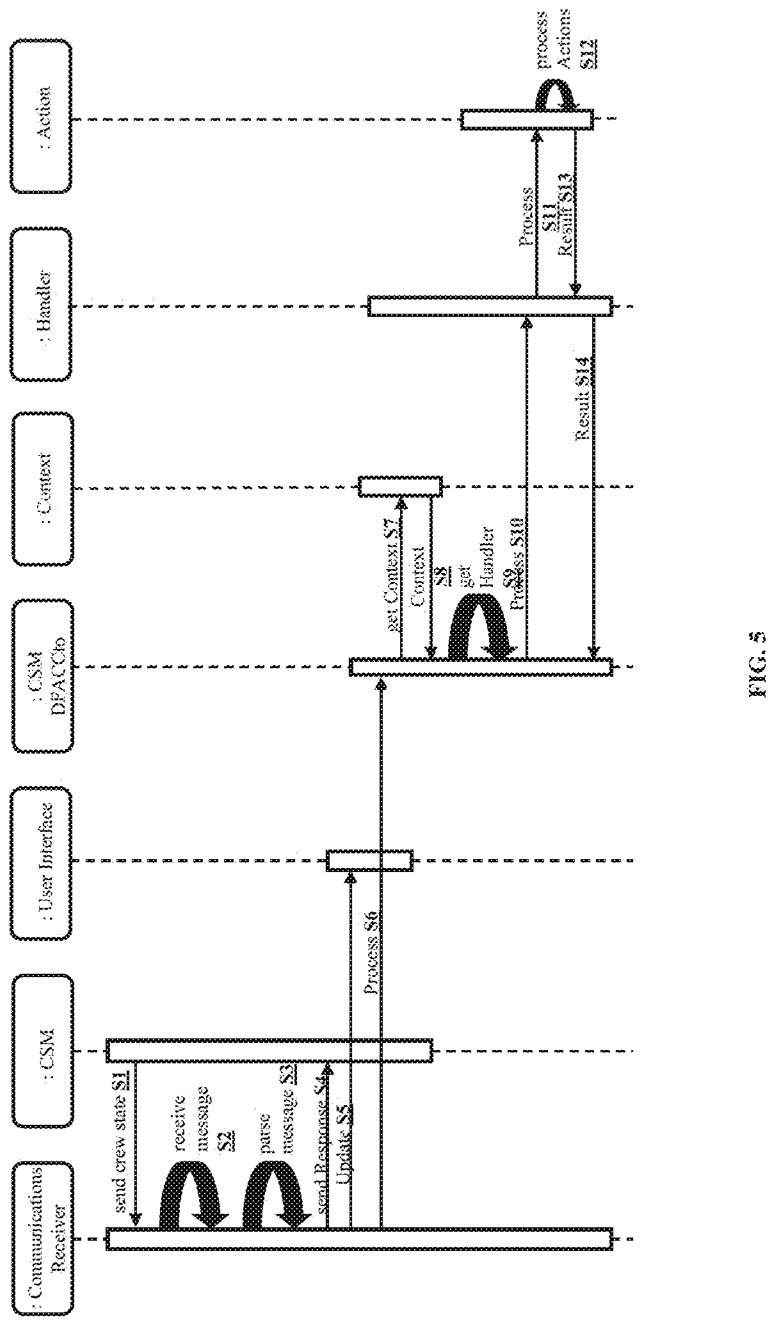
FIG. 5 is a sequence flow of a Dynamic Function Allocation Control Collaboration Protocol (DFACCto) controller consistent with various embodiments of the present disclosure.

At the heart of the DFA framework for human-autonomy teaming and collaboration in the present embodiments is the Dynamic Function Allocation Control Collaboration Protocol (DFACCto) embodied in a DFACCto Controller as discussed above. The DFACCto Controller implements CSM instructions and allocates and/or reallocates tasks between pilot(s) and the AAS of the vehicle/simulator. FIG. 5 represents an exemplary sequence diagram for DFACCto Controller communications during a simulation exercise. At S1, a communications receiver of the DFACCto controller receives a message from the CSM with instructions in accordance with monitored crew state. The DFACCto controller receives S2 and parses the message S3, sends a receipt response S4 to the CSM, provides any updates to UI resulting from message instructions S5, and processes the instructions S6. Processing the instructions in accordance with the protocol (DFACCto) includes requesting S7 and receiving S8 Context; getting handler S9; processing handler request S10; processing request for handler to process action S11, processing action by handler S12 and receiving result of processed action at handler S13 and returning result of process action S14.

Aspects disclosed herein relate to systems and methods configurable to determine the attention of one or more human operators while operating or controlling one or more functions of a vehicle. While certain embodiments relate a human operator's attention to a certain function or to an output device configured to provide information pertaining to the vehicle's operation, other embodiments relate to a human operator's transition from being attentive to a first function, class of function, and/or a location of information (or a class of function) to a second function, class of function, or location. Attention may be determined or derived from one or more processes.

The human performance assessment technology described above, including eye-tracking and analysis, may be incorporated as part of a mobile, real-time, and robust visual attention tracking system, Attention Learning Engine in Real-Time (ALERT) system. The ability to obtain data has historically been isolated to a controlled laboratory setting. Now, with mobile head-mounted eye tracking devices, we have the ability to monitor behaviors in the real-world. However, as we gain the benefit of mobility, we lose some capabilities such as a fixed coordinate frame. This means that we are unable to determine where the person is with respect to an external object. The current state of the mobile eye tracking systems facilitates collecting real-world data and analysis post-hoc, but the current state of the art is such that real-time monitoring is severely limited.

Real-time data enables an instructor or an external software program to provide feedback or cause changes in real-time. Therefore, we need eye tracking data to be transformed into world-coordinates instead of device coordinates. Essentially, we need to know where the person's head is in space. To do this we will use a real-time kinematic tracking system (RTKS) to obtain the global position of the head, combined with sensor fusion of the embedded inertial measurement unit for high-resolution and low-latency global positioning estimation. Specifically, we need to transform eye gaze from glasses coordinates to world coordinates. We propose to do this using a combination of sensor fusion and RTKS. The sensor fusion allows for low-latency and the RTKS provides the high-resolution spatial localization of the head, and therefore we can determine what a person is looking at in the environment.

Using a head-mounted or non-head-mounted eye tracker, such as that described herein, ALERT measures visual attention data through sensor fusion of the tracker's embedded inertial measurement unit with the resolution of a real-time kinematic tracking system (RKTS) that uses computer vision, processing data through tailored backend software for global attention tracking. More particularly, by converting the eyes' focal point from a local device perspective to global coordinates, the ALERT system has the ability to correct sensor drift, a common challenge with sensor fusion. The ALERT system and method require just one video camera utilizing computer vision, e.g., employing neural networks, to achieve precise head positioning. This low-cost RTKS method fused with sensor fusion is a novel methodology for world coordinate spatial localization and visual attention mapping to the environment which sets ALERT apart from other attention tracking solutions.

A frontend interface visualizes focus points, which allows trainers to observe and direct (if needed), and track historical performances of a trainee's attention during training sessions. ALERT offers a real-time window into the human operator's focus, enabling data-informed training to proactively mitigate threats to safety.

Figure 6:
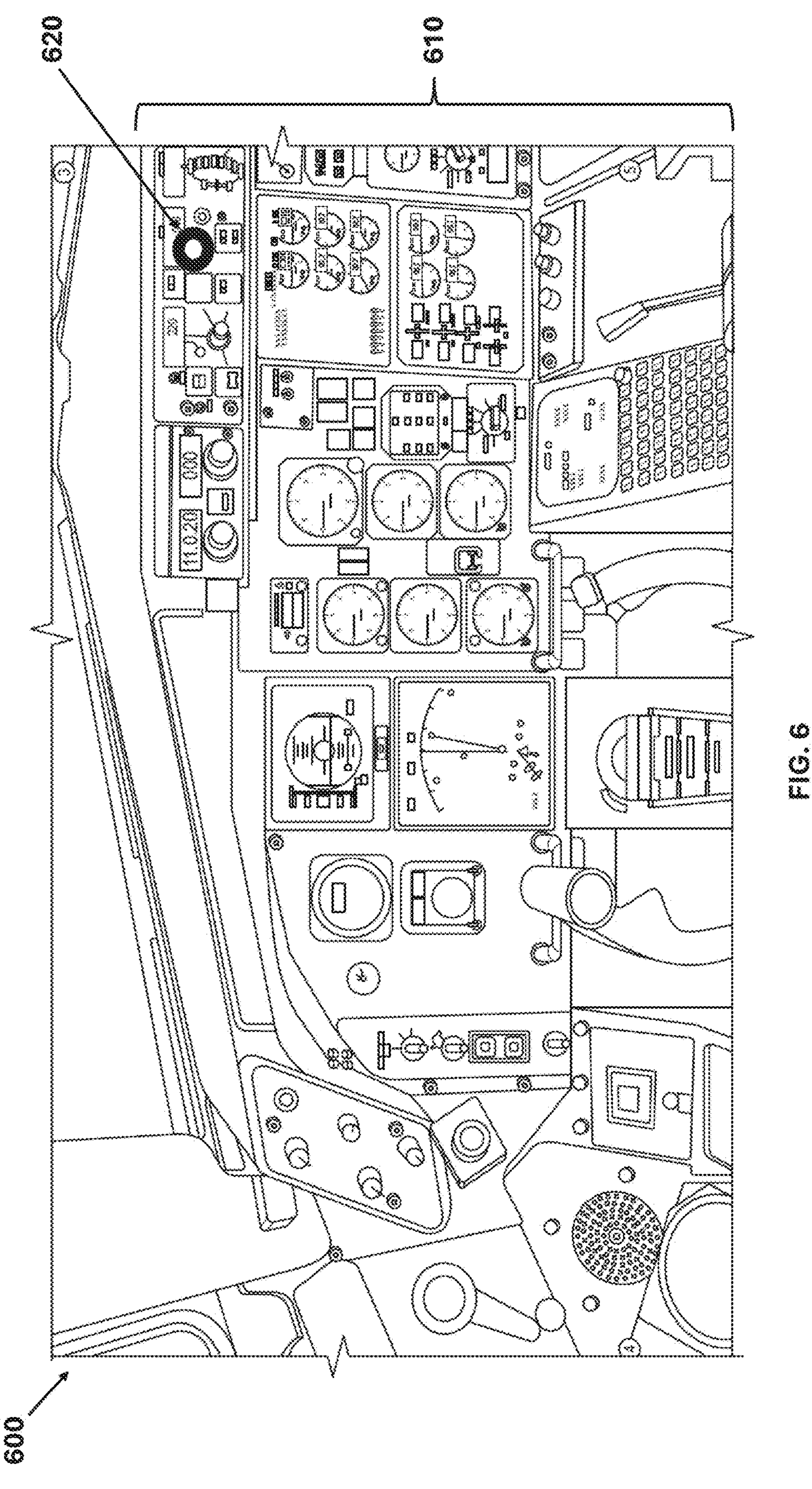
FIG. 6 provides an example cockpit having an operating panel and a location of a human operator's gaze determined in accordance with one or more embodiments herein.

In one embodiment of an exemplary ALERT system, the operator's eye gaze may be monitored. For example, FIG. 6 provides an example cockpit 600 having an operating panel 610 of a vehicle. The vehicle may be a simulated or operational vehicle, and as such the operating panel 610 may be mechanical, electrical, and/or remote with respect to the vehicle to be controlled or simulated. Through the use of one or more monitoring devices or sensors, a human operator's gaze may be determined over a period of time. For example, in the example of FIG. 6, location 620 may be the location of the human operator's eye gaze at a first moment. The time that the human operator's gaze is at location 620 and/or the vicinity of location 620 may be tracked to determine a length of time focusing in that area.

Figure 7A:
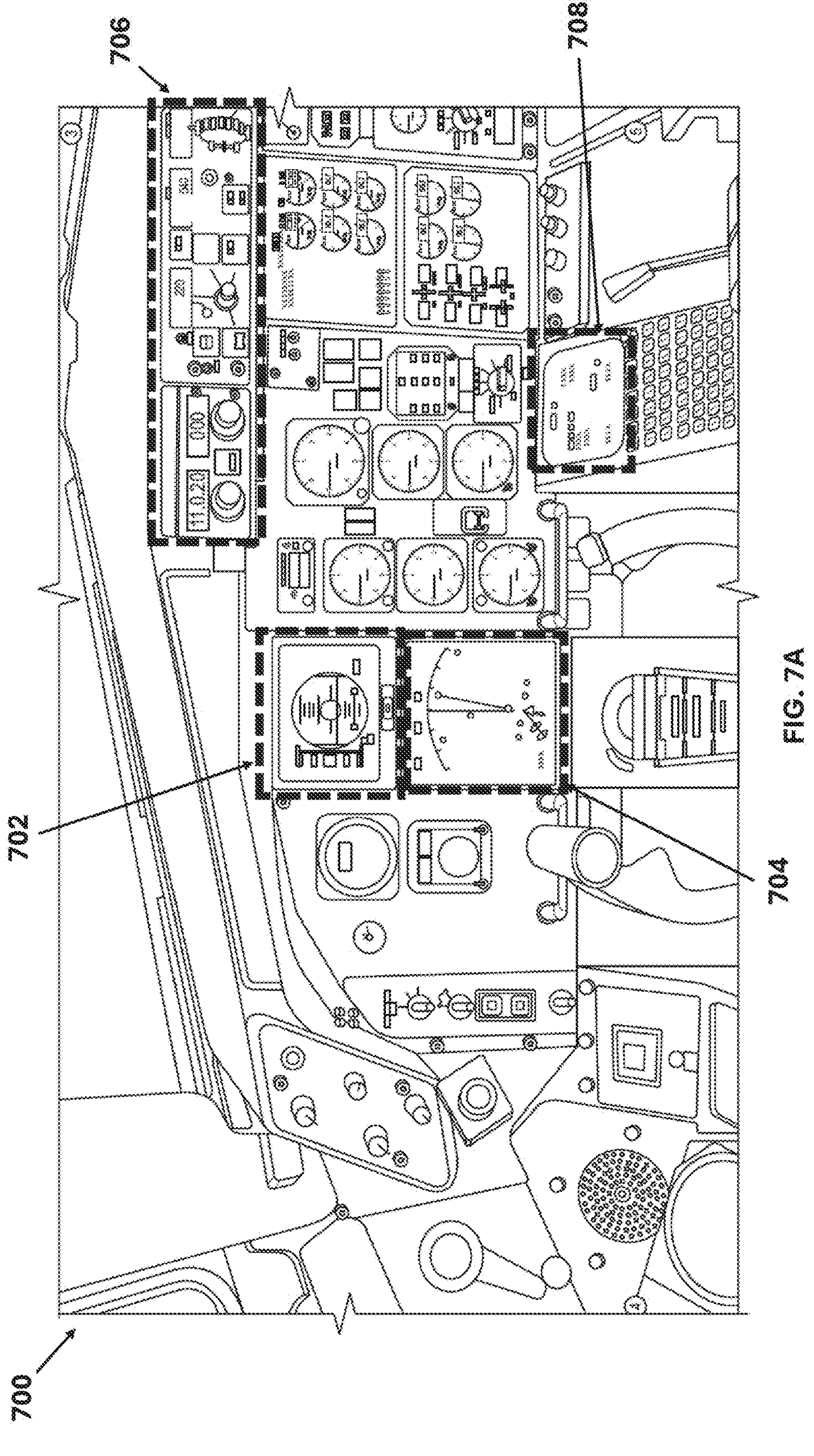
FIGS. 7A and 7B provide an example cockpit having an operating panel and Areas-of-Interest (AOIs) (FIG. 7A) and illustrative transitions between different areas with in the cockpit, including AOIs, (FIG. 7B) in accordance with one or more embodiments herein.

Further aspects relate to determining a human operator's attention between different functions or locations of output devices providing information of the vehicle's function or operation. FIG. 7A shows illustrative cockpit 700 having output device 702, output device 704, a cluster of related output devices 706, and output device 708. While example devices are shown as output devices, those skilled in the art will appreciate that many output devices may receive input. One example is a touchscreen display. Certain embodiments may track an operator's attention to one or more input devices, such as a steering apparatus or a portion thereof, a control stick or lever, or any other control mechanism. Generally, tracked devices (input or output) within the cockpit are also referred to herein as Areas-of-Interest (AOIs). In the embodiment of FIG. 7A, the tracked AOIs include: device 702 which may comprise or consist of a primary flight display (PFD) device; 704 which may comprise or consist of a Navigation Display (NAV) or Moving Map Display (MMD); device 706 which may comprise or consist of a Mode Control Panel (MCP) and device 708 which may comprise a Flight Management System (FMS). As is known to one skilled in the art, an FMS is an on-board multi-purpose navigation, performance, and aircraft operations computer designed to provide virtual data and operational harmony between closed and open elements associated with a flight from pre-engine start and take-off, to landing and engine shut-down.

Figure 7B:
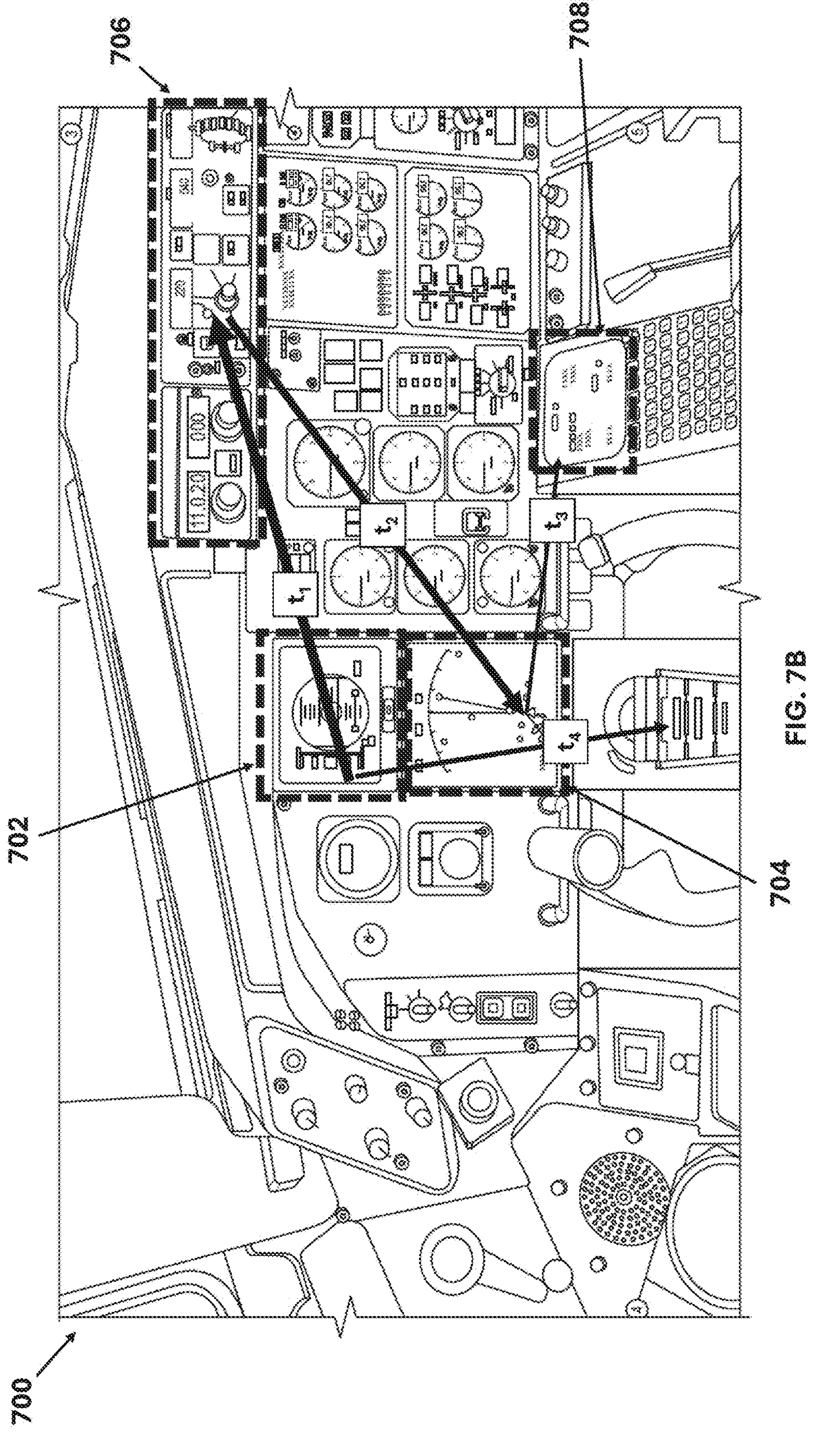

In one embodiment, attention, which may be measured via for example, eye transitions between different location regions (e.g., different clusters of information panels of a cockpit) may be monitored. FIG. 7B provides illustrative transitions between different areas of information pertaining to a vehicle's function(s). As shown in FIG. 7B, an operator's attention is measured with respect to for example, the quantity of eye gaze transitions between device 702 to cluster of devices 706, $t_1$, from cluster of devices 706 to device 704, $t_2$, from device 704 to device 708, $t_3$, and device 702, to another device, $t_4$, that may or may not be of interest. Quantity comparisons are generally indicated by arrow thickness in the FIGs. In certain embodiments, the time spent on such transition, i.e., length of the transition, is captured. For example, a first transition of attention from device 704 to device 708 may be approximately 0.5 seconds whereas another between the same devices may have taken 0.3 seconds. Further, although single arrows are shown in FIG. 7B, this is for illustrative purposes only and multiple attention patterns may be detected (see FIG. 12B).

Figure 8:
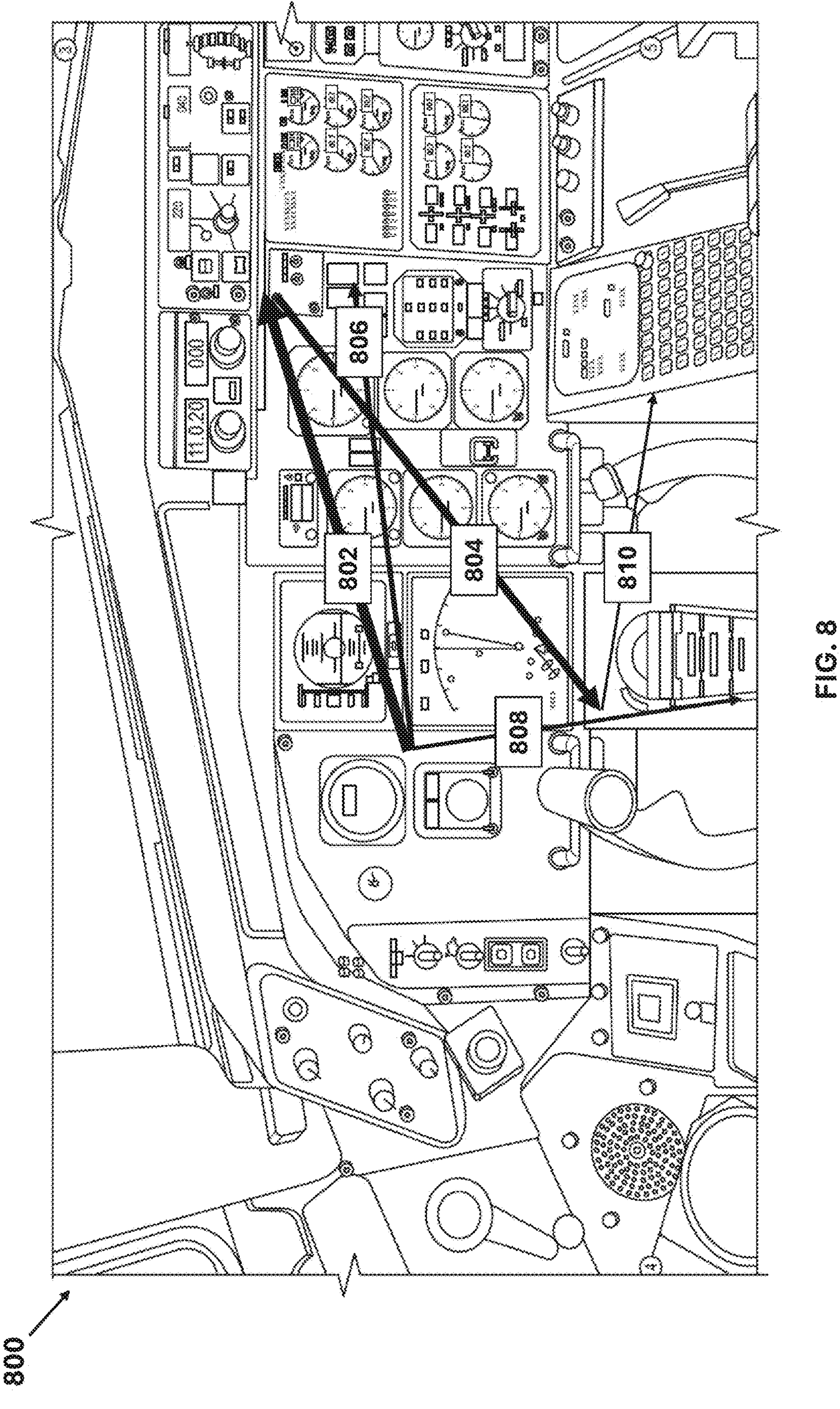
FIG. 8 provides an example cockpit showing an example scan pattern identification of a visual scanning assessment in accordance with one or more embodiments herein.

FIG. 8 shows the scan pattern, i.e., directionality of a human operator's gaze as it moves around the control area of cockpit 800 during an approximately 33 seconds time window Scan patterns may be used to identify and quantify the quantity, elapsed time, and/or ordering of the individual transitions between AOIs. By way of specific example, a scan pattern analysis of the transitions shown in FIG. 8 reveal that transition 802 accounted for 30% of the scan pattern time of the user, transition 804 accounted for 20% of the scan pattern time of the user, transition 806 accounted for 5% of the scan pattern time of the user, transition 808 accounted for 3% of the scan pattern time of the user and transition 810 accounted for 2% of the scan pattern time of the user. Individual transitions, t, represent a single eye movement from one point in the cockpit to a second point in the cockpit.

Figure 9:
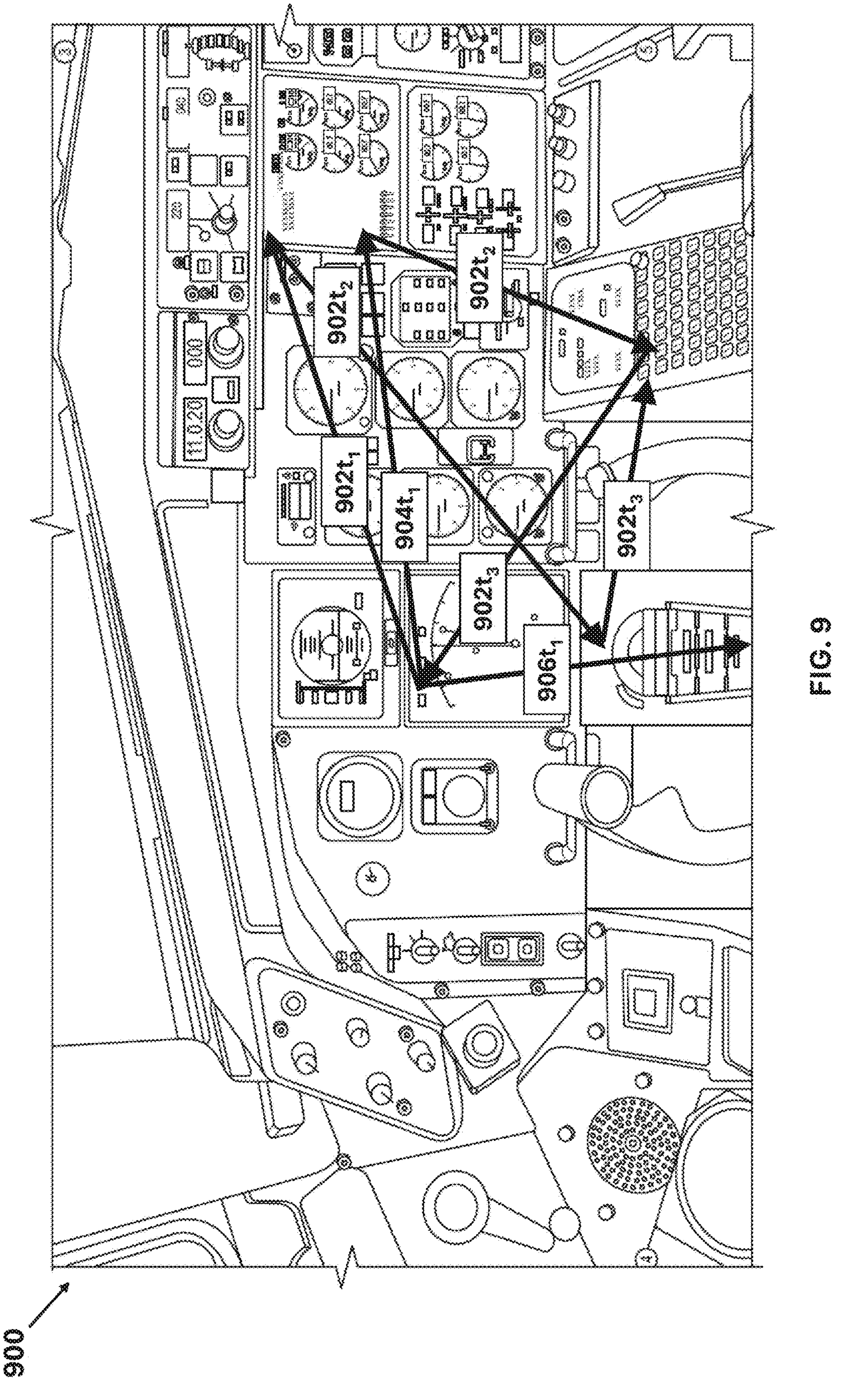
FIG. 9 provides an example cockpit showing an example scan pattern analysis of a visual scanning assessment in accordance with certain embodiments, wherein individual transitions are grouped together as individual scans in accordance with one or more embodiments herein.
Figures 10A, 10B, 10C, 10D:
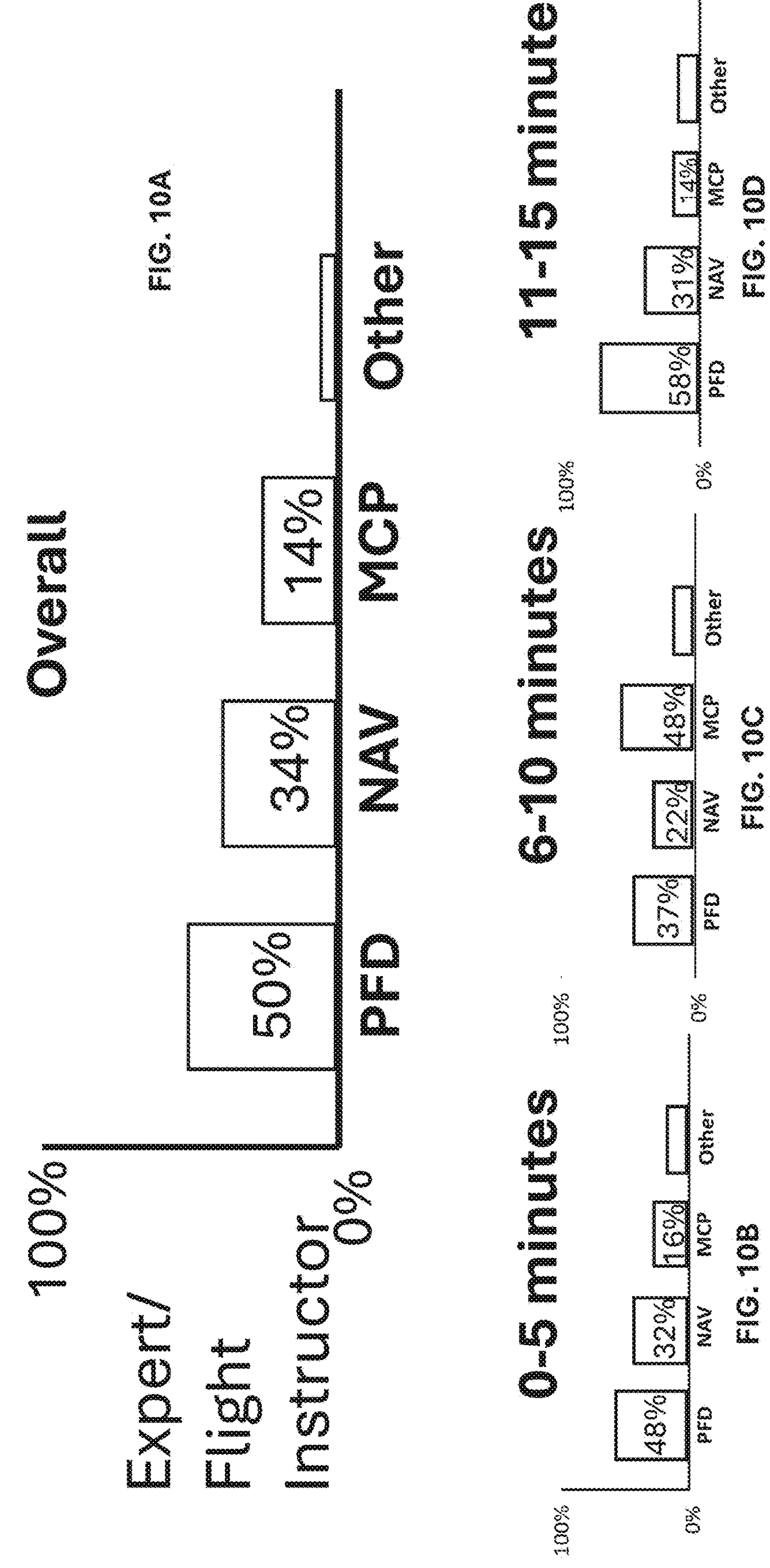
FIGS. 10A, 10B, 10C and 10D are bar graphs of an exemplary visual attention assessment in an exemplary scenario.

FIG. 9 shows an example scan pattern analysis of a visual scanning assessment in accordance with certain embodiments, wherein individual transitions may be grouped together as individual scans. Each scan could represent an operator's eye tracking pattern during a particular action. For example, an operator's scan patterns while operating in a cockpit 900 may be analyzed. The analysis may be conducted while an operator is undergoing a certain action, such as takeoff, landing, final approach and/or others. The analysis may be based upon the operator being instructed to perform a certain action or maneuver. In the illustrative example in FIG. 9, 3 scans are shown to represent the operator's attention over a time duration in which an operator's attention was monitored. Scan 1 (902) which has three transitions (902$t_1$, 902$t_2$, 902$t_3$) in a certain order represented about 50% of the total time duration, Scan 2 (904) which also has three transitions (904$t_1$, 904$t_2$, 904$t_3$) represented 40% of the total time duration, and Scan 3 (906), with a single transition 906$t_1$, represents the final 10% of the total time duration.

As exemplified in FIGS. 10A, 10B, 10C and 10D, a human operator's performance may be monitored over a several periods of time (either sequential, see e.g. FIG. 10A) and/or spaced apart by minutes (FIGS. 10B, 10C and 10D), days or longer. In the example shown in FIG. 10A, an operator's performance may be averaged from multiple time durations. One skilled in the art will appreciate that other summary statistics may be calculated from the monitored performance metrics and used in assessments and training, such as percentages, measures of central tendency (i.e., mean, median and mode) and measures of variability (i.e., standard deviation or variance, the minimum and maximum values, kurtosis and skewness).

Figures 11A, 11B:
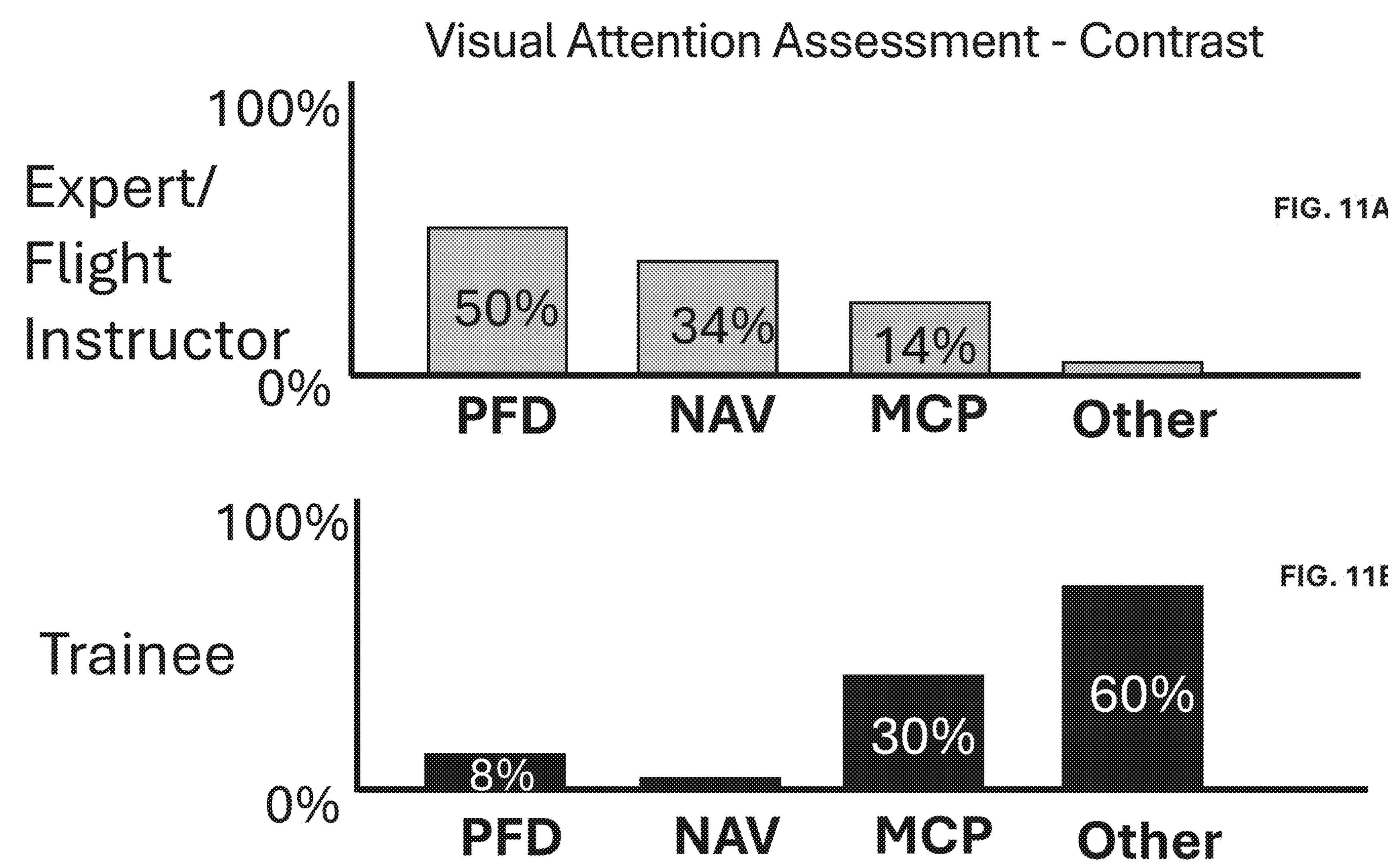
FIGS. 11A and 11B are bar graphs showing outcomes of attention analysis for the same scenario for an expert's transitions (FIG. 11A) and a trainee's transitions (FIG. 11B) for comparison in accordance with one or more embodiments herein.

Outcomes of attention analysis, such as one or more of the analyses described herein, may be compared. In the example of FIGS. 11A and 11B, an expert's transitions (which may be from a past or ongoing experience, such as using the same craft and/or same training or simulator criteria or events) FIG. 11A may be compared to a student, trainee or novice operator's performance FIG. 11B. This is useful because it may be used to permit feedback to be given to the new operator, e.g., such as determining that the human operator is transitioning too much between PFD and Other and/or not enough from PFD to NAV. Or it may be used to grade the human operator based on their transitions. It may reveal that a human operator is transitioning attention to an area too often or not enough. It may reveal that a human operator is transitioning to an inconsequential device as part of a routine that is adding time or otherwise reducing their focus on the task at hand. One or more methods disclosed herein could be used to see how an operator is progressing along their training. Further, even for experienced operators, comparing performances over time may reveal when the expert may not be performing optimally or is under duress.

Figure 12A:
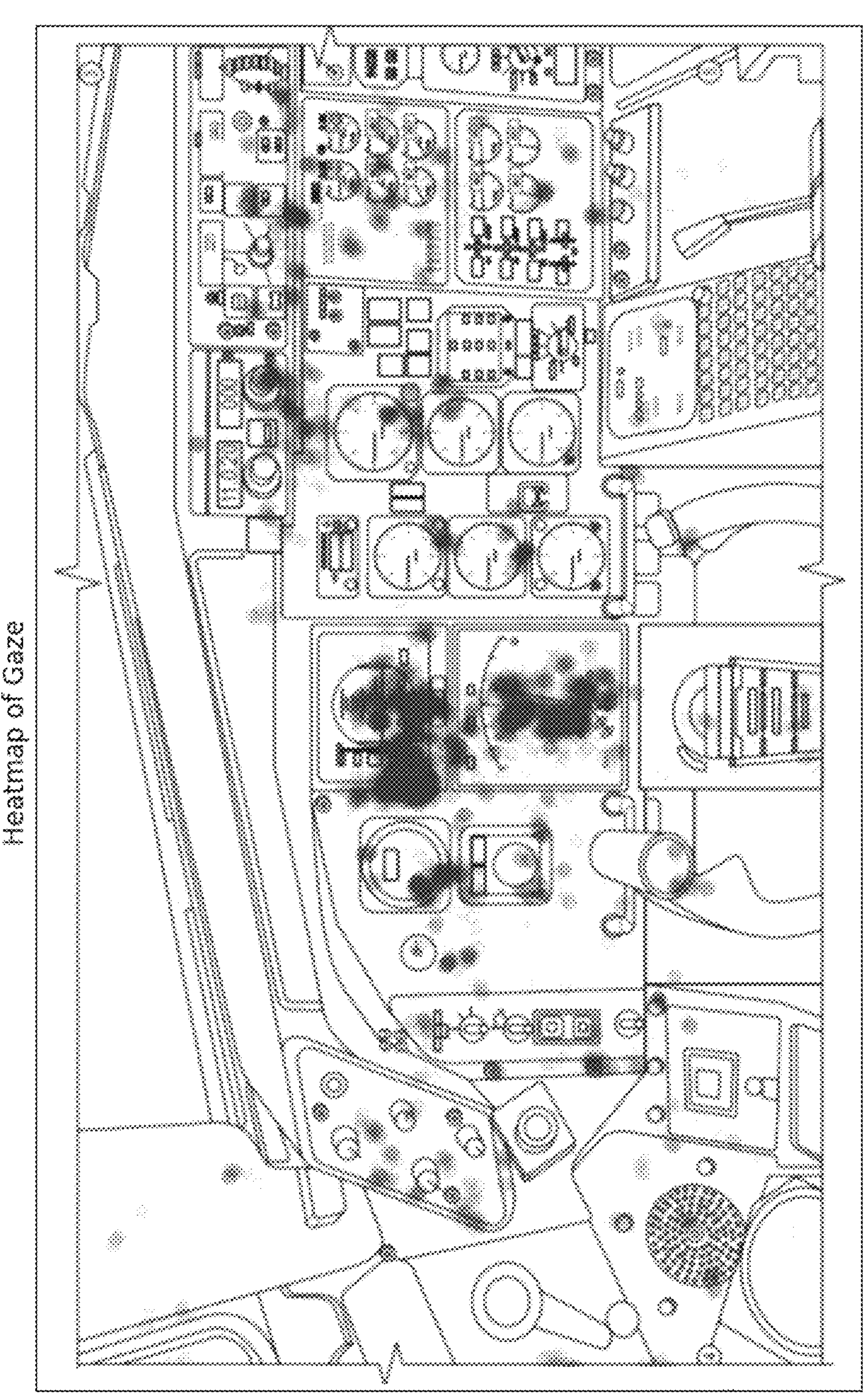
FIGS. 12A, 12B, and 12C provide specific, exemplary results for a human operator's attention between different functions or locations of output devices over a certain period of time in accordance with a particular embodiment herein.
Figure 12B:
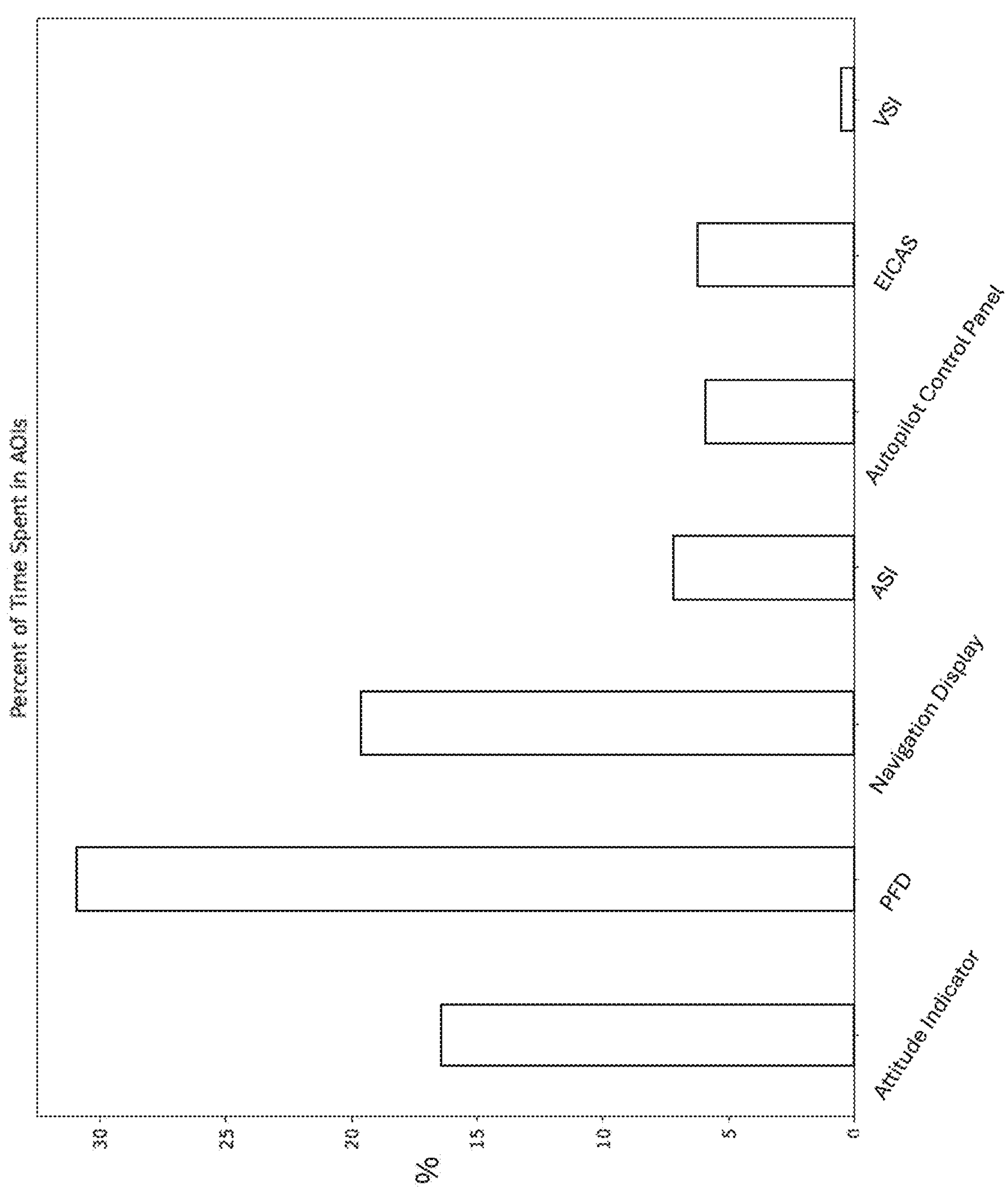
Figure 12C:
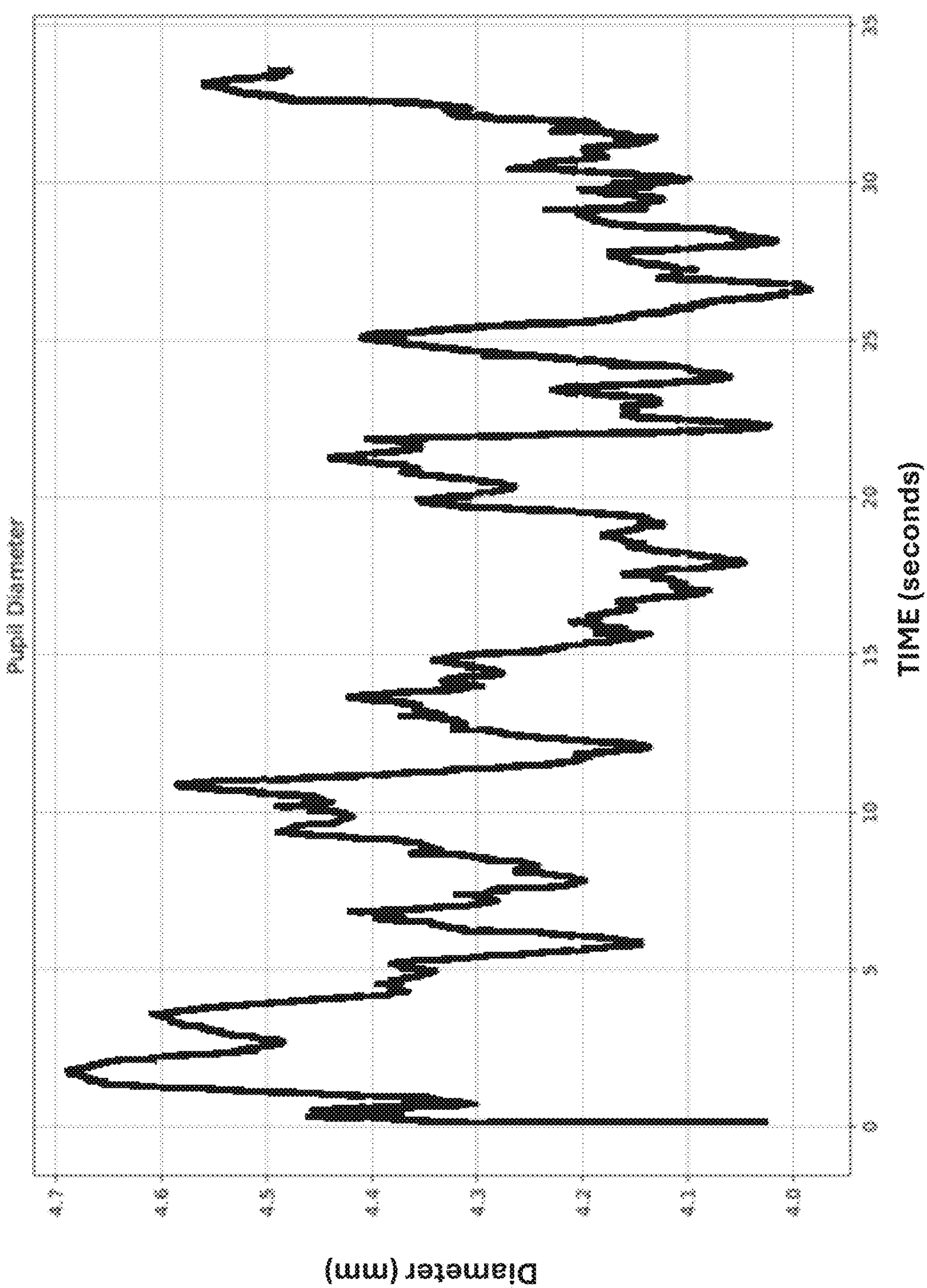

FIGS. 12A, 12B and 12C provide specific, exemplary results for a human operator's attention between different functions or locations of output devices over a certain period of time, e.g., approximately 33 seconds. FIG. 12A is a heatmap of the human operator's gaze within a cockpit, wherein size and intensity of the dots is indicative of the amount of time the human operator's gaze was detected at a certain location within the cockpit. FIG. 12B shows the approximate percentage of time that the human operator's gaze falls on particular areas of interest (AOIs) within the cockpit. AOIs represented in FIG. 12B include: attitude indicator, primary flight display (PFD), navigation display, air speed indicator (ASI), autopilot control panel, Engine Indicating and Crew Alerting System (EICAS) and vertical speed indicator (VSI). One skilled in the art will appreciate that other AOIs may also be monitored. Finally, FIG. 12C provides an indication of the human operator's pupil diameter during the approximately 33 seconds.

The advantage of ALERT over traditional, stationary eye-tracking systems is its unprecedented mobility and real-time processing, which provide immediate insights into pilot attention and workload in various flight conditions, leading to enhanced in-flight safety and training effectiveness. ALERT can add substantial improvements and value to aviation training and safety management systems (SMS). The frontend interface visualizes focus points, allowing for trainers to observe and direct (if needed), and track historical performances of a trainee's attention during training sessions. By granting instructors real-time insight into a trainee's focus, ALERT enables precise and tailored feedback, enhancing efficiency and adding value via the current Federal Aviation Administration (FAA) sanctioned advanced qualification program (AQP). The technology extends its utility by amassing rich attention tracking data of trainees progressing through sessions and enabling data-driven enhancements to instruction techniques and curricula. This data-centric approach provides objective measures to complement current subjective assessments. The approach enables training acceleration and enhances safety, making pilot training more cost-effective, but also ensures that pilots' attentional skills are honed to match the demands of evolving flight deck technologies. The novel safety data ALERT generates will enable training-based mitigations for in-time risk and threat management that is scalable, agile, and tailorable to operations within envisioned future airspace system.

As described in detail above, the embodiments integrate physiological sensors, advanced machine learning (ML) algorithms, and real-time DFA (Dynamic Functional Allocation) protocols. The physiological sensors continually monitor the human operator's cognitive and physical state, identifying risks such as incapacitation, high workload, and distractions. Advanced machine learning analyzes these data patterns to enhance predictive capabilities, facilitating proactive interventions to mitigate potential safety risks.

Certain embodiments are directed to a computer program product (e.g., nonvolatile memory device), which includes a machine or computer-readable medium having stored thereon instructions which may be executed by a computer (or other electronic device) to perform these operations/activities.

In addition, an apparatus can include one or more apparatuses in computer network communication with each other or other apparatuses and the implementations relate to control and/or communication of aspects of the disclosed features, functions, operations, processes, methods, steps, and/or benefits, for example, data or information involving local area network (LAN) and/or Intranet based computing, cloud computing in case of Internet based computing, Internet of Things (IoT) (network of physical objects—computer readable storage media (e.g., databases, knowledge bases), devices (e.g., appliances, cameras, mobile phones), vehicles, buildings, and other items, embedded with electronics, software, sensors that generate, collect, search (query), process, and/or analyze data, with network connectivity to exchange the data), online websites. In addition, a computer processor can refer to one or more computer processors in one or more apparatuses or any combinations of one or more computer processors and/or apparatuses. An aspect of an implementation relates to causing and/or configuring one or more apparatuses and/or computer processors to execute the described operations. The results produced can be output to an output device, for example, displayed on the display or by way of audio/sound. An apparatus or device refers to a physical machine that performs operations by way of electronics, mechanical processes, for example, electromechanical devices, sensors, a computer (physical computing hardware or machinery) that implement or execute instructions, for example, execute instructions by way of software, which is code executed by computing hardware including a programmable chip (e.g., chipset, computer processor, electronic component), and/or implement instructions by way of computing hardware (e.g., in circuitry, electronic components in integrated circuits, and the like)—collectively referred to as hardware processor(s), to achieve the functions or operations being described. The functions of embodiments described can be implemented in a type of apparatus that can execute instructions or code.

More particularly, programming or configuring or causing an apparatus or device, for example, a computer, to execute the described functions of implementation of the disclosure creates a new machine where in case of a computer a general-purpose computer in effect becomes a special purpose computer once it is programmed or configured or caused to perform particular functions of the implementations of the disclosure pursuant to instructions from program software. According to an aspect of an embodiment, configuring an apparatus, device, computer processor, refers to such apparatus, device or computer processor programmed or controlled by software to execute the described functions.

A program/software implementing the embodiments may be recorded on a computer-readable storage media, e.g., a non-transitory or persistent computer-readable storage medium. Examples of the non-transitory computer-readable media include a magnetic recording apparatus, an optical disk, a magneto-optical disk, and/or volatile and/or non-volatile semiconductor memory (for example, random access memory (RAM), ROM, etc.). Examples of the magnetic recording apparatus include a hard disk device (HDD), a flexible disk (FD), and a magnetic tape (MT). Examples of the optical disk include a DVD (Digital Versatile Disc), DVD-Read-only memory (DVD-ROM), DVD-Random Access Memory (DVD-RAM), BD (Blue-ray Disk), a Compact Disc (CD)-Read Only Memory (CD-ROM), a CD-Recordable (CD-R) and/or CD-Rewritable (CD-RW). The program/software implementing the embodiments may be transmitted over a transmission communication path, e.g., a wire and/or a wireless network implemented via hardware. An example of communication media via which the program/software may be sent includes, for example, a carrier-wave signal.

Although several embodiments have been described above with a certain degree of particularity, those skilled in the art could make numerous alterations to the disclosed embodiments without departing from the spirit of the present disclosure. It is intended that all matter contained in the above description or shown in the accompanying drawings shall be interpreted as illustrative only and not limiting. Changes in detail or structure may be made without departing from the present teachings. The foregoing description and following claims are intended to cover all such modifications and variations.

Various embodiments are described herein of various apparatuses, systems, and methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," "an embodiment," or the like, means that a particular feature, structure, or characteristic described in connection with the embodiment is included in at least one embodiment. Thus, appearances of the phrases "in various embodiments," "in some embodiments," "in one embodiment," "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation.

Any patent, publication, or other disclosure material, in whole or in part, which is said to be incorporated by reference herein is incorporated herein only to the extent that the incorporated materials do not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A method for determining a visual attention of a human operator to an operating panel of a vehicle during operation of the vehicle, the method comprising:

receiving, by a processor, data indicative of a gaze direction of the human operator from at least one monitoring device over a first period of time and a second period of time;

determining, by the processor, an approximate location of the gaze direction of the human operator on the operating panel at different individual times over the first period of time and the second period of time;

identifying, by the processor, an individual areas-of-interest (AOI) located at each of the determined approximate locations of the gaze direction;

calculating, by the processor, a first value and a second value for at least one metric using at least the determined approximate locations on the operating panel at the different individual times and the identification of the individual AOIs located at the determined approximate locations over the first and second periods of time to determine the visual attention of the human operator to the operating panel;

assessing, by the processor using the at least one metric, a performance of the human operator during an action of the vehicle, the assessing including comparing the first value for the at least one metric to a standard value for the at least one metric;

comparing, by the processor, the first value for the at least one metric for the first period of time to the second value for the at least one metric for the second period of time to compare the performance of the human operator between the first and second periods of time; and performing an automated task by the vehicle based on the comparison of the performance of the human operator between the first and second periods of time.

2. The method of claim 1, wherein the at least one metric includes: an approximate length of time that the gaze direction of the human operator fell on each of the identified individual AOI during the first period of time; an amount of time for each transition between the gaze direction falling on a first individual AOI and a second individual AOI; and/or an amount of time determined for a sequence of multiple transitions, wherein each of the multiple transitions includes an amount of time between the gaze direction falling on the first individual AOI and the second individual AOI.

3. The method of claim 1, wherein the at least one metric is an order in which the human operator gazed upon different ones of the individual AOI over the first period of time.

4. The method of claim 1, wherein determining the approximate location of the gaze direction of the human operator on the operating panel at the different individual times over the first and second periods of time includes receiving focal point data for eyes of the human operator collected by at least one of a head-mounted eye tracker and a non-head-mounted eye tracker.

5. The method of claim 1, further comprising identifying, by the processor, a non-AOI time period within the first and second periods of time during which the gaze direction of the human operator does not fall on any one of the identified individual AOIs.

6. The method of claim 5, wherein calculating the first and second values for the at least one metric further includes using the identified non-AOI time period.

7. The method of claim 6, further comprising assessing, by the processor, the performance of the human operator during the action of the vehicle using the at least one metric, wherein the assessing includes comparing the second value for the at least one metric to the standard value for the at least one metric.

8. The method of claim 1, further comprising dynamically allocating one or more vehicle operation tasks of the human operator to the vehicle based on the comparison of the performance of the human operator between the first and second periods of time.

9. The method of claim 1, wherein the processor processes the data received from the at least one monitoring device using a machine learning model to determine a cognitive state of the human operator and package the data into a free form data string stream for transmission to a second processor.

10. At least one non-transitory computer-readable medium storing instructions that, when executed by a computer, perform a method for determining a visual attention of a human operator to an operating panel of a vehicle during operation of the vehicle, the method comprising:

receiving, by a processor, data indicative of a gaze direction of the human operator from at least one monitoring device over a first period of time and a second period of time;

determining, by the processor, an approximate location of the gaze direction of the human operator on the operating panel at different individual times over the first and second periods of time;

identifying, by the processor, an individual areas-of-interest (AOI) located at each of the determined approximate locations of the gaze direction;

calculating, by the processor, first and second values for at least one metric using at least the determined approximate locations on the operating panel at the different individual times and the identification of the individual AOIs located at the determined approximate locations over the first and second periods of time to determine the visual attention of the human operator to the operating panel;

assessing, by the processor using the at least one metric, a performance of the human operator during an action of the vehicle, the assessing including comparing the first value for the at least one metric to a standard value for the at least one metric;

comparing, by the processor, the first value for the at least one metric for the first period of time to the second value for the at least one metric for the second period of time to compare the performance of the human operator between the first and second periods of time; and performing an automated task by the vehicle based on the comparison of the performance of the human operator between the first and second periods of time.

11. The at least one non-transitory computer readable medium of claim 10, wherein the at least one metric includes: an approximate length of time that the gaze direction of the human operator fell on each of the identified individual AOI during the first period of time; an amount of time for each transition between the gaze direction falling on a first individual AOI and a second individual AOI; an amount of time determined for a sequence of multiple transitions, wherein each of the multiple transitions includes an amount of time between the gaze direction falling on the first individual AOI and the second individual AOI; and/or an order in which the human operator gazed upon different AOI over the period of time.

12. The at least one non-transitory computer readable medium of claim 10, wherein determining the approximate location of the gaze direction on the operating panel at the different individual times over the first and second periods of time includes receiving focal point data for eyes of the human operator collected by at least one of a head-mounted eye tracker and a non-head-mounted eye tracker.

13. The at least one non-transitory computer readable medium of claim 10, the method further comprising identifying, by the processor, a non-AOI time period within the first and second periods of time during which the gaze direction does not fall on any one of the identified individual AOIs.

14. The at least one non-transitory computer readable medium of claim 13, wherein calculating the first and second values for the at least one metric further includes using the identified non-AOI time period.

15. The at least one non-transitory computer readable medium of claim 14, further comprising assessing, by the processor, the performance of the human operator during the action of the vehicle using the at least one metric, wherein the assessing includes comparing the second value for the at least one metric to the standard value for the at least one metric.

16. A method for determining a visual attention of a human operator to an operating panel of a during vehicle operation of the vehicle, the method comprising:

receiving, by a processor, data indicative of a gaze direction of the human operator from at least one monitoring device over first and second predetermined periods of time;

determining, by the processor, an approximate location of the gaze direction of the human operator on the operating panel at different individual times over the first and second predetermined periods of time;

identifying, by the processor, an individual areas-of-interest (AOI) located at each of the determined approximate locations of the gaze direction;

calculating, by the processor, first and second values for at least one metric using at least the determined approximate locations on the operating panel at the different individual times and the identification of the individual AOIs located at the determined approximate locations during the first and second predetermined periods of time to determine the visual attention of the human operator to the operating panel;

assessing, by the processor, a performance of the human operator during an action of the vehicle, the assessing including comparing the first value for the at least one metric to a standard value for the at least one metric;

comparing, by the processor, the first value for the at least one metric to the second value for the at least one metric to compare the performance of the human operator between the first and second predetermined periods of time; and calculating a summary statistic for the value of the at least one metric using a first value for the at least one metric calculated during the first predetermined period of time and a second value for the at least one metric calculated during the second predetermined period of time.

17. The method of claim 16, wherein the at least one metric is selected from a group consisting of: an approximate length of time that the human operator's gaze fell on each of the identified individual AOI during the period of time; an amount of time for each transition between the human operator's gaze falling on a first individual AOI and a second individual AOI; an amount of time determined for a sequence of multiple transitions, wherein each of the multiple transitions includes an amount of time between a human operator's gaze falling on a first individual AOI and a second individual AOI; and an order in which the human operator gazed upon different AOI over the period of time.

18. The method of claim 16, further comprising commanding, by the processor, one or more subsystems of the vehicle to perform one or more automated tasks based on the comparison of the performance of the human operator between the first and second predetermined periods of time.

19. The method of claim 16, further comprising dynamically allocating one or more vehicle operation tasks of the human operator to the vehicle based on the comparison of the performance of the human operator between the first and second predetermined periods of time.

20. The method of claim 16, wherein the processor processes the data received from the at least one monitoring device using a machine learning model to determine a cognitive state of the human operator and package the data into a free form data string stream for transmission to a second processor.

* * * * *